United States Patent [19]
Mason et al.

[11] Patent Number: 5,260,911
[45] Date of Patent: Nov. 9, 1993

[54] SEISMIC SURVEYING

[76] Inventors: Iain M. Mason, 17 Crick Road; Geoffrey M. Jackson, 11 Pusey Lane, both of Oxford; Delman Lee, Flat 17 Fordie House 82 Sloane Street, London; David S. R. Campbell, 3 Oakfield, Walton-On-Thames Surrey 1EG, all of United Kingdom; Charles C. Mosher, 2600 Winond Dr., Plano, Tex. 75074

[21] Appl. No.: 706,577

[22] Filed: May 28, 1991

[30] Foreign Application Priority Data

May 25, 1990 [GB] United Kingdom ............... 9011836

[51] Int. Cl.⁵ ............................................. G01V 1/28
[52] U.S. Cl. ...................................... 367/57; 367/58
[58] Field of Search .................. 367/56, 57, 58, 54, 367/36

[56] References Cited

U.S. PATENT DOCUMENTS

| | | | |
|---|---|---|---|
| 2,148,422 | 2/1939 | Blau | 367/56 |
| 2,276,335 | 3/1942 | Peterson | 367/36 |
| 2,654,874 | 10/1953 | Press | 367/58 |
| 2,718,929 | 9/1955 | Weiss | 367/37 |
| 3,858,167 | 12/1974 | Stas et al. | 367/36 |
| 3,961,307 | 6/1976 | Hochheimer et al. | 367/48 |
| 4,351,035 | 9/1982 | Buchanan et al. | 367/48 |
| 4,393,484 | 7/1983 | Buchanan et al. | 367/56 |
| 5,005,159 | 4/1991 | Krohn | 367/57 |

FOREIGN PATENT DOCUMENTS 0598003  3/1978  U.S.S.R. ........................ 367/37

OTHER PUBLICATIONS

"Cross-Borehole Observation of Mode Conversion from Borehole Stoneley Waves to Channel Waves at a Coal Layer"; Geophysical Prospecting, 38, 607-620; James N. Albright and Paul A. Johnson, 1990.

"Surface Motion of a Layered Medium Having an Irregular Interface Due to Incident Plane SH Waves"; Journal of Geophysical Research (JGR) 75, 933-954; K. Aki and K. L. Larner, 1970.

"Crust-mantle Whispering Gallery Phases: A deterministic Model of $P_n$ Wave Propagation"; JGR 85, 5416-5422; W. H. Menke and P. G. Richards, 1980.

"P-SV Resonances in Irregular Low-velocity Surface Layers"; BSSA 75, 847-864.

"Resonances of Low-velocity Layers with Lateral Variations"; Bulletin of the N. R. Hill and A. R. Levander, 1984.

"Faulting and Hydrocarbon Entrapment: The Leading Edge", 9, 20-22; M. W. Downey, 1990.

Primary Examiner—Ian J. Lobo
Attorney, Agent, or Firm—Wenderoth, Lind & Ponack

[57] ABSTRACT

A method of seismic surveying uses seismic waveguides in the earth. Seismic energy is transmitted from outside the waveguide and detected within the waveguide or vice-versa. Coupling of energy between the outside and the inside of the waveguide is effected by energy leakage at coupling sites where the waveguide departs from planarity. The method analyzes seismic signals to determine the position and nature of coupling sites and the propagation characteristics of the waveguide.

17 Claims, 18 Drawing Sheets

SEISMIC SURVEYING

BACKGROUND OF THE INVENTION

The invention relates to a method of seismic surveying which utilizes a seismic waveguide in the earth.

In a medium that can be approximated by layers or strata, seismic energy may become concentrated in the low velocity layers by processes of refraction and total internal reflection. The seismic energy then follows the layer and the loss of intensity due to spreading out from the source is reduced compared with the loss of intensity for free spreading in 3-dimensional (3-D) space. This has two implications: firstly seismic arrivals that have propagated along a low-velocity layer will be detectable at greater distances from the source than would normally be the case. Secondly, if one knows where the low velocity layer runs, one knows the path along which the arrival has travelled.

In a perfectly plane-layered medium the refraction of seismic energy as it enters a low-velocity layer prevents it from becoming trapped in the low velocity layer (waveguide). Therefore seismic sources outside the waveguide cannot produce arrivals that then become guided and travel along the low-velocity layer. However, if there is an imperfection in the planar nature of the medium, the possibility of generating guided energy with an external source arises. The deviation from planarity interacts with the incident wavefield to give a "secondary" seismic source that is within the low-velocity layer. Hence coupling between sources outside the low-velocity layer and guided modes becomes possible, but it is restricted to the sites of deviations from planarity.

The reciprocal argument to that above also applies: waveguide modes will only radiate body waves into the space outside the waveguide when they encounter deviations from perfect plane layering.

It has been recognised that deviations from planarity are necessary for coupling between modes in a buried waveguide and seismic energy outside the waveguide. Hill and Levander (1984) (a list of references is given later) showed that random roughness on the boundaries of a buried low-velocity layer produced coupling that excited waveguide modes, giving a possible explanation for the codas on teleseismic observations. Menke and Richards (1980) model tele-seismic $P_n$ arrivals by a "whispering gallery" formed by the (large scale) velocity structure of the crust and mantle. Coupling of body waves with guided modes in the surface low-velocity layer has been studied with reference to tele-seismology (eg Aki and Larner, 1970; Levander and Hill, 1985). The coupling of body waves and bore-hole guided waves has been extensively studied in exploration geophysics (eg White, 1983; Hardage, 1981). Albright and Johnson (1990) documented coupling between borehole guided waves and coal seam waveguide modes.

Thus the fact of coupling between energy guided in a buried low-velocity layer and body waves outside the low-velocity layer has been recognized. However, the importance of localized coupling and the possibility of locating sites of coupling has not been recognized. According to the invention there is provided a method of seismic surveying which utilizes a seismic waveguide in the earth whereby a first region is defined as the region within the waveguide and a second region is defined as the region outside the waveguide, the method consisting in generating seismic energy by means of one or more energy sources situated in one of said regions, detecting seismic energy which leaks by energy coupling to the other of said regions by means of one or more transducers in the other of said regions and analyzing the characteristics of the detected seismic energy to locate localized deviations from planarity which give rise to said energy coupling. The coupling is localized at deviations of the earth from planarity (faults, lateral changes in a sedimentary sequence). We have shown how this coupling can be used for the purposes of locating the site of coupling. We have also demonstrated the feasibility of characterizing the deviation from planarity giving rise to the coupling and the feasibility of characterizing the low velocity layer between the site of coupling and the point of observation/point of signal generation within the low-velocity layer.

Essentially two data acquisition methods are envisaged. One involves recording (detecting seismic energy) within the waveguide while generating seismic body waves outside the waveguide. The other is the reciprocal technique of generating guided energy with a seismic source within the waveguide and recording the scattered body waves outside the waveguide. Access to the buried waveguide would be provided by one or more boreholes. The locations outside the waveguide at which the body waves are generated/recorded will in most cases be the surface of the earth, but mine workings and other boreholes could also be used. In the explanations below, although we refer to the case of body waves generated at a set of surface sources and recorded by borehole geophones within the waveguide, the arguments apply equally to the other acquisition geometries mentioned above.

Each surface source generates body waves that propagate to the buried low-velocity layer. Only where the shape or material properties of the low velocity layer changes does the possibility of waveguide mode excitation arise. Excitation of the waveguide at each of these points of change generates energy that propagates laterally within the waveguide. This energy is then recorded in one or more boreholes in the waveguide. The minimum recording necessary would be a single geophone orientated non-perpendicularly to the polarization of the waveguide modes or a pressure transducer in the fluid filled borehole if the waveguide modes had a dilational component. Preferably, however, there is provided a triaxial geophone that measures all three components of particle motion. Recording at a number of points along the borehole (within the low-velocity layer) provides even greater information on the waveguide modes and enhance signal discrimination.

The raw data therefore consists of a set of seismic traces for each surface source point. The seismic trace is normally a record of particle velocity through time, although the signal would be pressure in the case of a pressure transducer. Time on the seismic trace refers to time elapsed after the release of the "shot" responsible for the generation of the body waves, where "shot" means any correlatable seismic source, including say drill bit noise. The seismic trace provides data on the times required for energy (of different modes and frequencies) to propagate from the body wave source to the geophone. When the data from the seismic traces of a number of source positions is put together, the desired waveguide modes can be identified. Information is provided on the position of the site of coupling, the propagation characteristics of the waveguide and the nature of the departure from planarity at the coupling site.

Using the approximation of a horizontally stratified earth, the dependence of travel time (from surface source to a coupling site in the waveguide) on the source position is a function only of the relative position measured horizontally (the offset) of the source with respect to the point on the waveguide. This relationship can be obtained directly from the observed direct arrivals on the seismic traces. Mode converted arrivals will have travel times made up of a time from surface to coupling site (downgoing time) plus a time for propagation in the waveguide. Times derived from a set of traces corresponding to different sources recorded at the same geophone (a common-receiver gather) will share a waveguide propagation time while their downgoing times obey the relationship between source offset and travel time derived from the direct arrivals. Only energy that fits this model is accepted as being guided energy. The relationship between downgoing travel time and source offset also allows the identification of the position of the coupling site, although there is ambiguity for certain distributions of sources. If the position of the coupling site is known, the waveguide travel times for the different frequency components allow the reconstruction of the relationship between phase velocity and frequency (dispersion curve) for that propagation path. This can be done for different waveguide modes from the same coupling site and for different coupling sites, leading to a characterisation of guided mode propagation in the low velocity layer. If propagation in the waveguide is successfully characterized, and the downgoing wavefield incident on the coupling site is known, information on the coupling can be extracted that in turn constrains the nature of the departure from planarity at the coupling site.

SUMMARY OF THE INVENTION

Significant localized lateral changes in a low velocity layer will occur where the layer is intersected by a geological fault. Faults and strata are assumed to be locally planar, so their intersection forms a line of sites at which coupling can occur. Coherent energy radiated from a line of coupling points will be significantly stronger than the radiation from a single one of them. Therefore we envisage lines of coupling sites formed by the intersection of the low-velocity layer and a fault to be features likely to generate detectable arrivals at the downhole geophone.

Faults are commonly important controls on the accumulation of oil and gas, so a survey that provides information on them could be of great value. Most of the gas reserves found beneath the Southern North Sea occur in the Permian Rotliegendes sandstone. Gas accumulation often occurs in upthrown fault blocks, i.e. areas that are bounded by faults and within which the sandstone is now structurally higher. The level of interest also forms a low velocity layer. The overlying Permian Zechstein evaporites have high velocities of up to 6000 m/s (P waves). The Rotliegendes level has velocities in the range 3500 m/s to 4000 m/s (P waves) and there is a trend of increasing velocity with depth (at a rate of about 1.6 m/s per meter) for the underlying 700 m or so into the Carboniferous section. The level of interest is thus a low-velocity layer and a waveguide. Seismic velocity typically has a negative correlation with porosity and permeability. Instances in which the level of interest forms a low velocity layer are quite common in oil and gas prospecting since sealing cap rocks need to be impermeable, reservoir rocks must be porous and permeable, gas in the pore space reduces seismic velocity and in general, velocities increase with depth in a sedimentary basin. Even when the prospective level is not itself a low velocity layer in the layered sequence of a sedimentary basin, there might be a waveguide immediately above or below for which the faulting could be assumed to match that in the reservoir level.

Fault zones may form barriers to or conduits for hydrocarbon migration. Examples in which faulting controls oil and gas accumulation are common in the geological and geophysical literature (e.g.-Downey, 1990). The location and characterization of faults is therefore envisaged as an important application of the method proposed here.

Lateral changes in the rocks within the low velocity layer would also provide coupling between the waveguide modes and sources outside the waveguide. These changes could be sedimentological (a change in the rocktype or a change in the mix of rocktypes within the low velocity layer), intrusive (salt or shale movement, volcanic dikes and sills) or secondary (a change in pore fluids, porosity or permeability). All of these can have relevance to the accumulation of hydrocarbons and their mapping and characterization are envisaged as another important use of the technique suggested here.

Coal seams often form waveguides and prior knowledge of faults is important for many aspects of mine planning—reserve estimates, extraction schedules, hazard detection and water management. The mapping and characterization of faults in a coal seam is thus also envisaged as an important application of the method.

Waveguide analysis of side-scattered energy from lateral changes in an approximately plane-layered earth overcomes some serious problems with more general treatments of scattered energy. Conventional reflection seismic imaging techniques are well adapted to propagation at high angles to the layering. Behavior is not sensitive to variations in individual thin layers and there is only weak interaction between modes. This allows imaging through an incompletely known overburden and it also allows some simplifying assumptions like acoustic wavefield propagation, weak scattering and constant density. Imaging using these assumptions becomes impractical if energy propagates almost parallel to the layering, as is the case here for the propagation between the site of coupling and observation. Waveguide theory provides some alternative simplifying assumptions. Energy is assumed to remain in the low-velocity layer. One need concern oneself only with the velocity structure of that layer. Our idea that significant coupling between the waveguide and external modes will only occur at locally-linear lateral changes in the low-velocity layer allows the theory for energy propagating at high angles to the layering to be applied to the downgoing energy outside the waveguide, while waveguide theory can be used for the propagation of energy from the site of coupling to the observation point in the waveguide.

Apart from locating faults and other lateral changes in the waveguide, the technique provides the opportunity of characterizing waveguide mode propagation ie the phase velocity and attenuation as a function of frequency. If the surface source character, the downward propagation and coupling are well known, this can be done by observation of arrivals in only one borehole. Observation of corresponding arrivals in two or more boreholes would greatly facilitate the characterization of waveguide propagation, since observed differences could be attributed to differences in the waveguide propagation path. The waveguide propagation characteristics can be use to estimate the velocity profile of the waveguide and if successful this allows the for characterization of the coupling between the freely propagating body waves and the channel waves. The coupling transfer functions can be obtained for a number of faults in a given survey. With sufficient geological input (the likely form of the discontinuity, the contrasts in material properties etc) it might be possible to invert the coupling transfer function for parameters like fault throw. Alternatively empirical relations could be established for the prediction of fault throw. The throw of high-angle (near vertical) faults is particularly important as it may control the continuity of permeability and the volume of hydrocarbons trapped (parameters essential to reservoir engineering). In the coal mine environment it may decide whether or not mechanized extraction can continue across the fault.

The survey technique proposed here can thus provide additional information on geologic faults and other lateral changes in a low velocity layer. The technique will be most valuable in exploration and development geophysics when it is used in conjunction with conventional practices. Surface seismic data, well control and a geologic model would be used to provide the model through which to propagate the downgoing energy, to map the waveguide (in 3-D) away from the borehole as well as providing a framework for the interpretation of the survey results. In return we have independent verification of the other data sources since different modes of energy (coupled waveguide—body waves) are being observed with a different acquisition geometry. The definition of some vital parameters like fault position, fault throw and the lateral continuity of permeability and porosity can be improved.

In a marine environment the downhole tool remains fixed while the surface sources are quickly provided by a seismic boat with airguns. On land a single downhole source could shoot into an array of surface geophones. On land and at sea this survey can be acquired by simply recording with a downhole tool while conventional surface seismic data is being recorded. When recording downhole, multi-well surveys can be acquired in the same time as a single-well survey by simultaneous recording. The acquisition of these data can therefore be highly economical.

In investigating the feasibility of this technique, it must be demonstrated that arrivals resulting from the coupling of body waves and buried waveguides are strong enough to be identified on noisy field data. We identify such arrivals on a field dataset and show that on the basis of their polarization and arrival time they must be the desired waveguide modes.

BRIEF DESCRIPTION OF THE DRAWINGS

The invention will further be described with reference to the accompanying drawings, of which.

DESCRIPTION OF THE PREFERRED EMBODIMENTS

Figure 1:
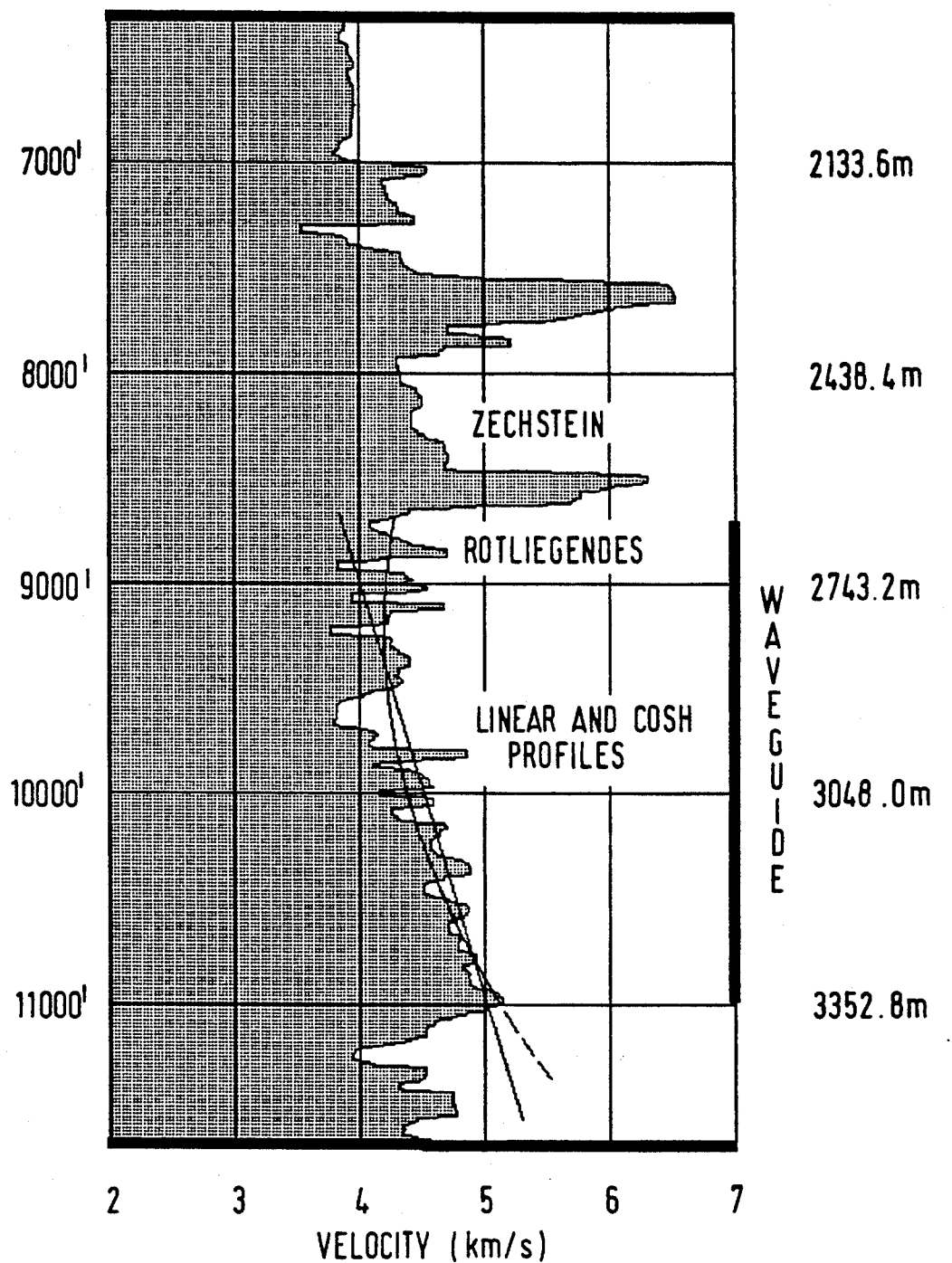
FIG. 1 is a typical velocity profile illustrating a seismic waveguide region.

A triaxial geophone was placed at a depth of approximately 3 km in a borehole in the Southern North Sea. It was locked against the borehole wall within the Permian Rotliegendes sandstone. The Rotliegendes sandstone and the underlying 600 m to 700 m of Carboniferous section form a low velocity layer. Limestones and evaporites with high seismic velocities of up to 6000 m/s form the roof of the waveguide and a general velocity gradient of about +1.6 m/s per meter, starting at the base of the Rotliegendes and continuing down into the Carboniferous, creates the bottom of the waveguide. FIG. 1 is a typical velocity profile of the Permian and Carboniferous levels, taken from a Sonic log. The waveguide is formed by a sharp drop in velocity at the base Zechstein/top Rotliegendes interface underlain by an interval of about 700 m in which the increase in velocity with depth can be approximated by a linear or hyperbolic cosine function. Surface seismic data and well control show that strata are approximately horizontal at this level. Indications of near vertical faults with throws ranging from 20 m to 300 m are present on surface seismic data and fault zones have been observed from drilling. These faults have been mapped with a dense grid of surface seismic lines to give a map of their (linear) intersections with the top of the Rotliegendes sandstone. We therefore have a testing ground for the proposed survey technique:

We have a buried waveguide.

We have a set of near vertical faults that intersect the waveguide, providing localized changes (significant departures for planarity) that should provide coupling between body waves and waveguide modes.

A well established geophysical technique (surface reflection) has mapped the faults so the performance of the technique can be evaluated.

Figure 2:
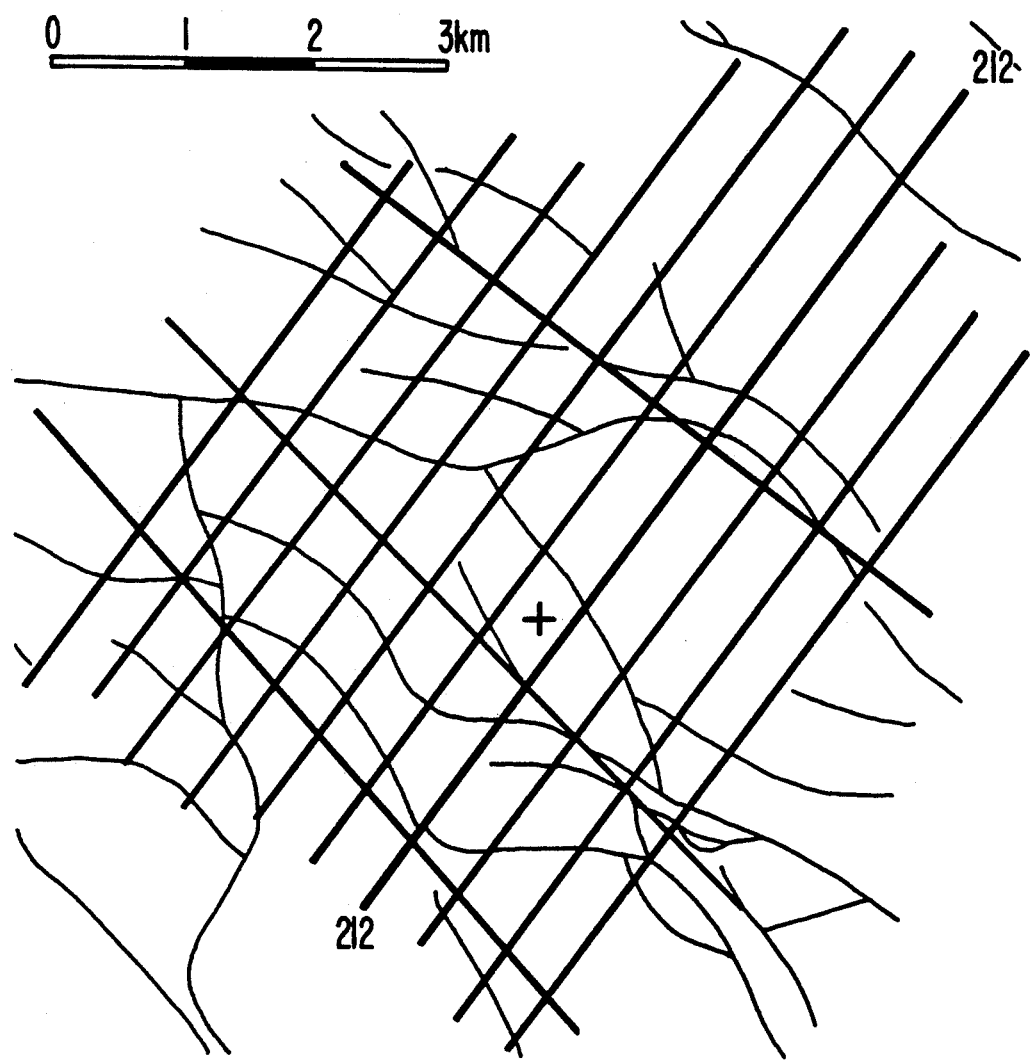
FIG. 2 is a survey layout diagram.
Figure 3:
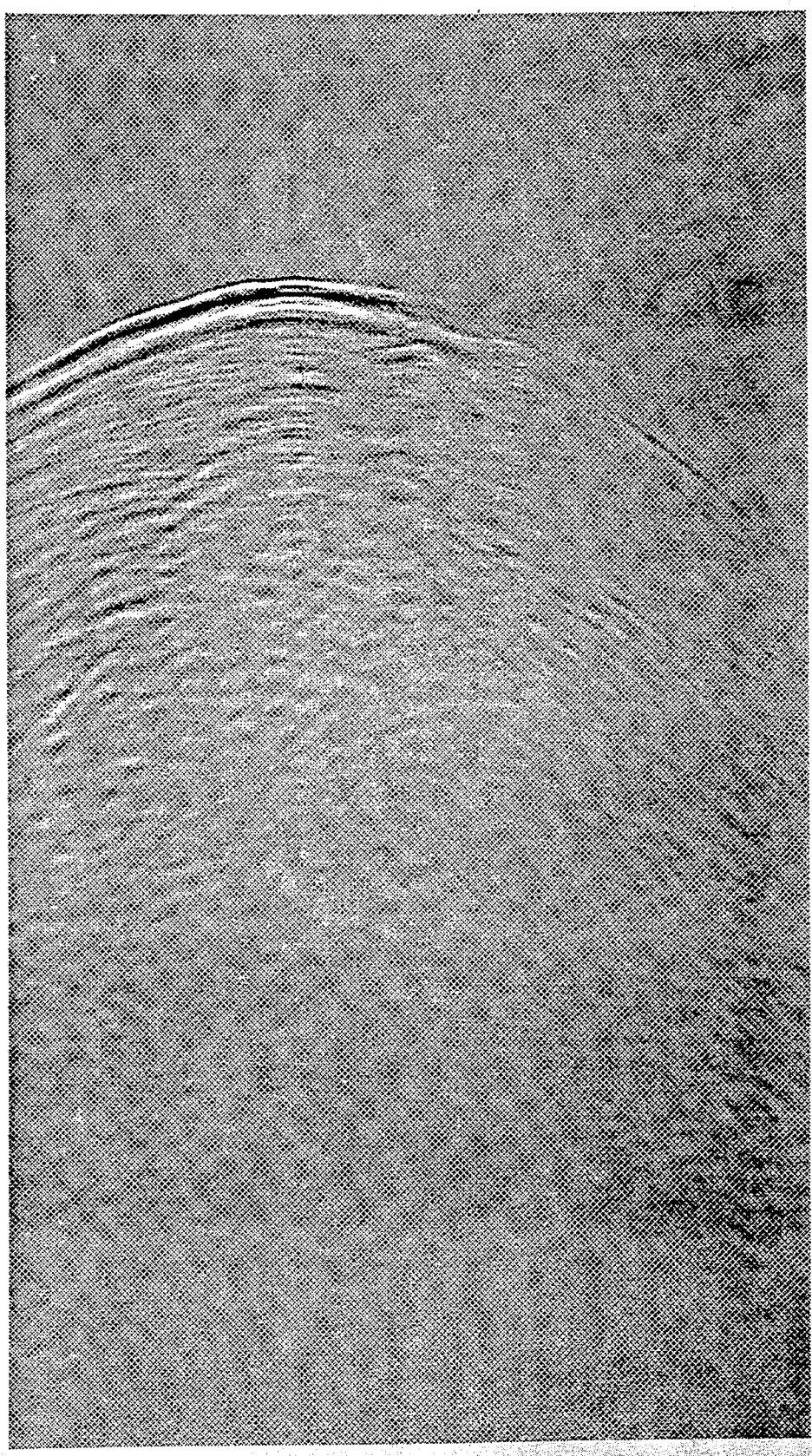
FIG. 3 is an illustration of vertical component geophone response for line 212 of FIG. 2.
Figure 4:
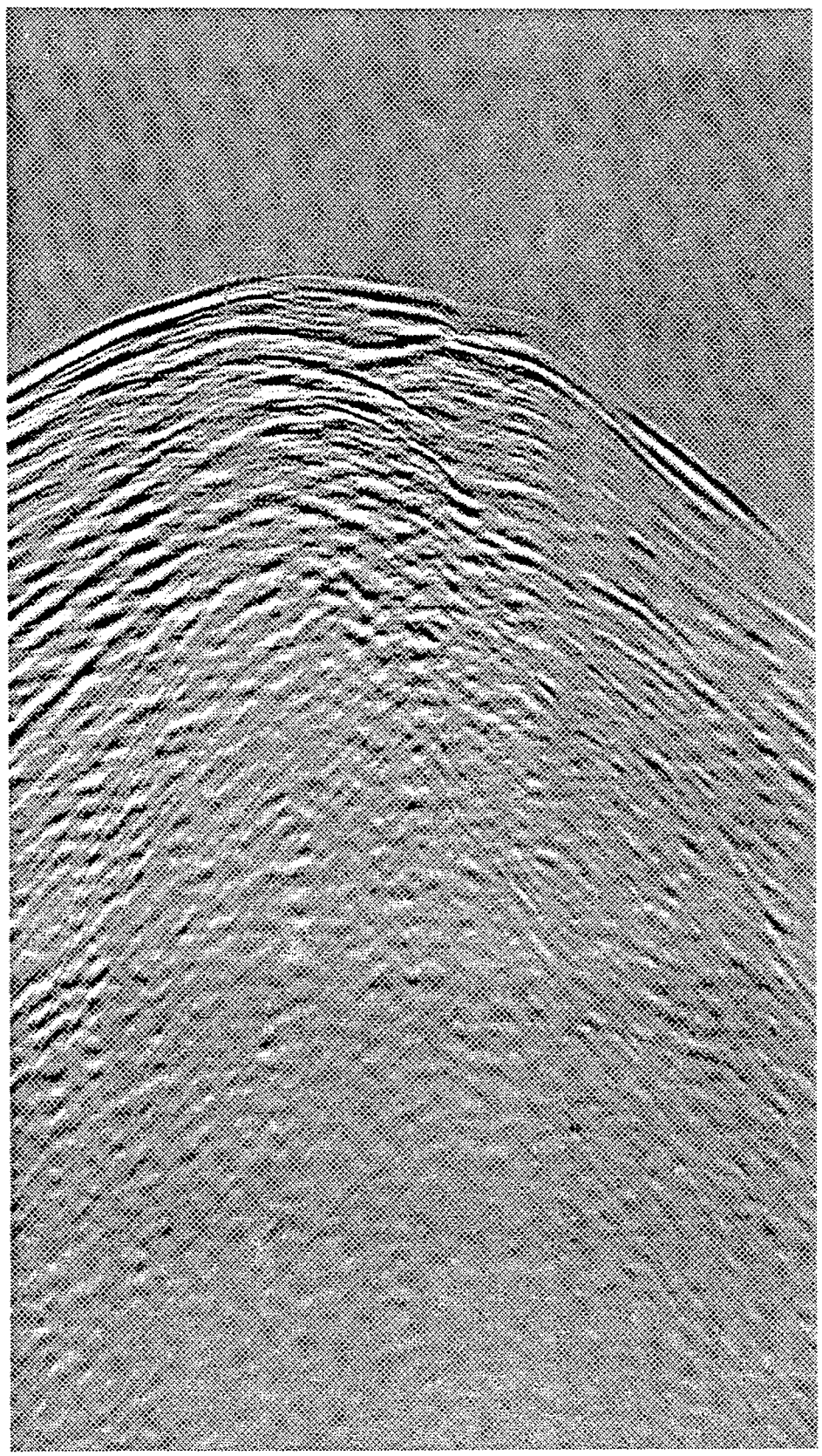
FIG. 4 is an illustration of horizontal component geophone response of line 212 of FIG. 2.

Marine seismic airguns were released at intervals of 26.6 m along a set of lines as shown in FIG. 2. In FIG. 2 thick lines show the surface source lines, thin lines show the traces of faults in the top Rotliegendes interface as mapped from surface reflection surveys. The cross marks the position of the downhole geophone. Data were recorded for each shot at the downhole geophone. Three seismic traces were obtained for each shot—a vertical component and two perpendicular horizontal components. Displayed in FIGS. 3 and 4 are the trace gathers for the vertical and in line horizontal components for Line 212. In FIGS. 3 and 4 the horizontal axis is source position (SW to NE) along the 7.6 km line. The vertical axis is time from 0 to 4 s. The first (and strongest) energy to arrive is the direct P arrival (FIG. 3). In FIG. 4 the gather shows the signal recorded by the component of the triaxial geophone orientated along the direction of the line of surface shots ie the "inline" component. These components of Line 212 were chosen for the purposes of illustration because Line 212 passes close to vertically above the geophone and Line 212 lies roughly perpendicular to the geologic strike of the area. Therefore the inline horizontal and vertical components of recording here approximate recording in a system that has no variation in the crossline direction ("2-D") allowing for a simplified explanation. All of the concepts have been extended to the full survey in our work, but essential features of the survey technique become less clear.

Note on FIG. 3 the direct arrival which gives the relationship between source offset and arrival time to be expected for the desired arrivals in the case of a laterally invariant (1-D) earth. The first arrival can be approximated by a hyperbola, which has as defining parameters its curvature and the position of its apex (along the line and in time). Arrivals produced by coupling between the downgoing wavefield and changes in the horizontal waveguide should have the same curvature as the direct arrival and their apices should be at the same position along the line as the site of coupling but delayed (with respect to the direct arrival) by the waveguide travel time. Since the waveguide travel time is expected to be directly proportional to the distance between the coupling site and downhole geophone, the apices of this type of arrival should lie along the two straight lines on the data which start at the apex of the direct arrival and moveout toward the ends of the line with a slope given by the reciprocal of the waveguide propagation velocity.

Figure 5:
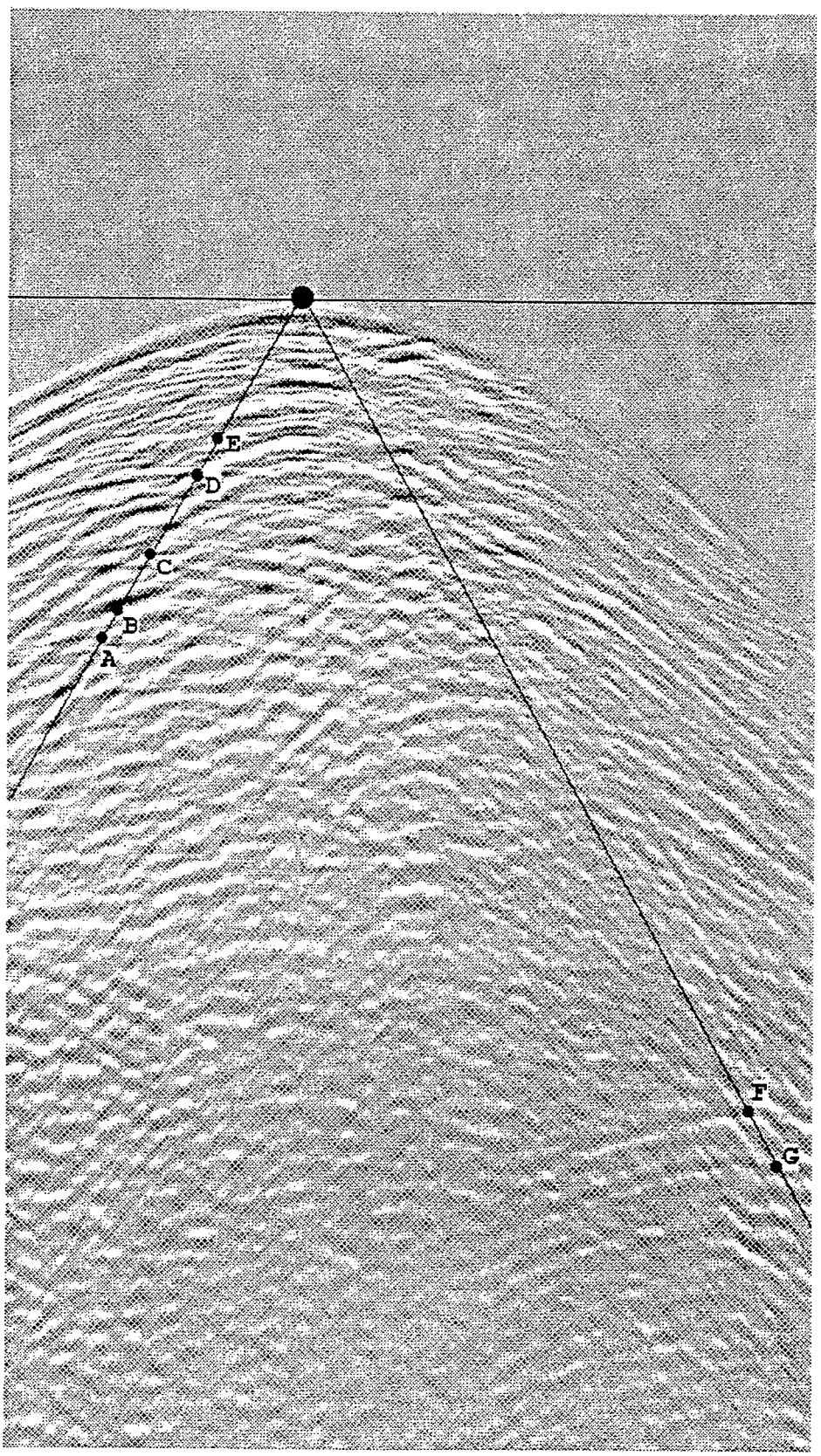
FIG. 5 is an illustration of the geophone response of FIG. 3 with a move-out line added.
Figure 6:
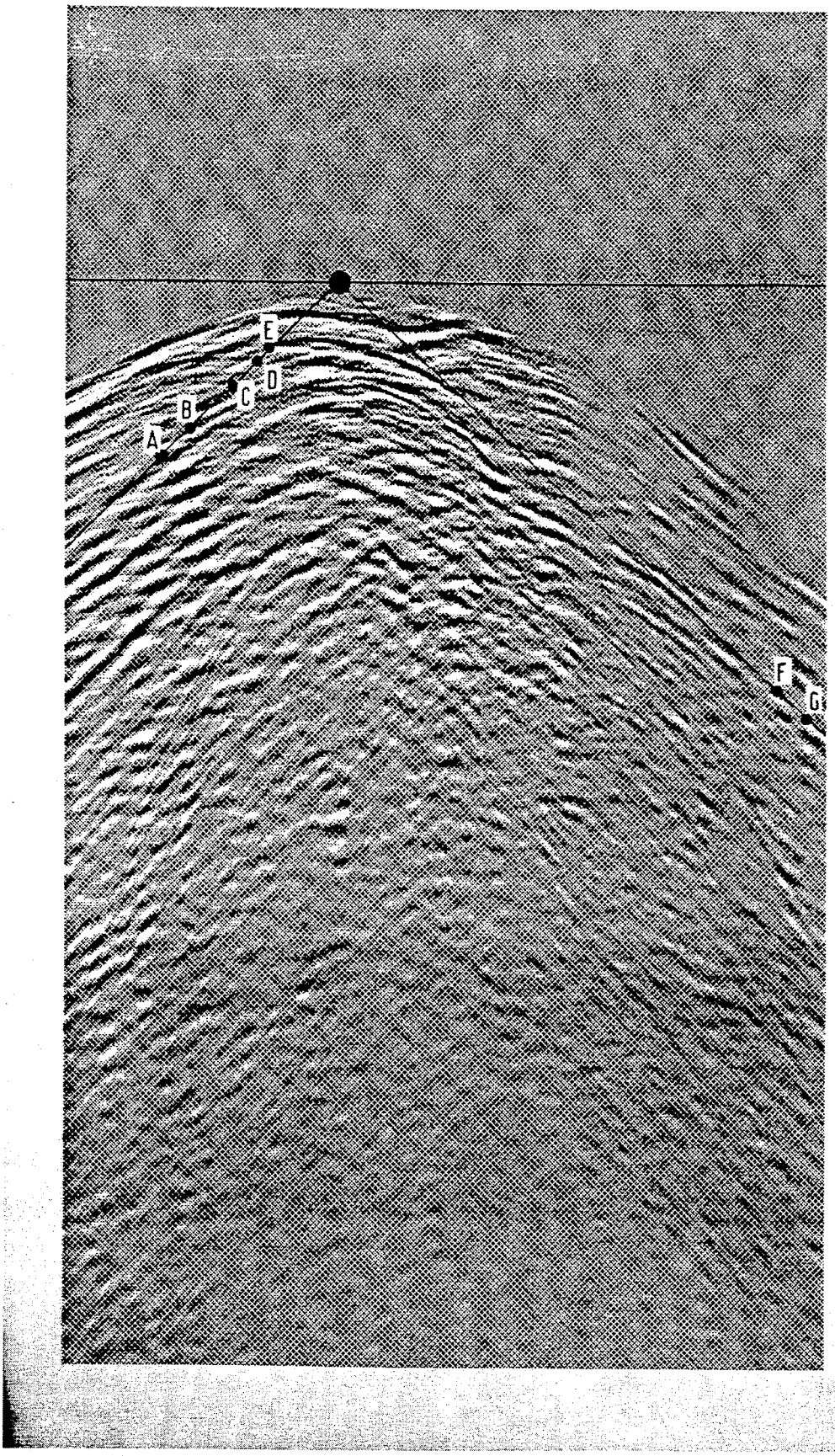
FIG. 6 is an illustration of the geophone response of FIG. 4 with a move-out line added.

FIG. 5 is the vertical component receiver gather of line 212 showing the moveout line for P-S arrivals. The apices of interpreted arrivals are shown with the smaller black dots and the apex of the direct arrival is shown with the large black dot. The direct arrival has been attenuated in order to show the waveguided arrivals more strongly. The horizontal axis is source position (SW to NE) along the 7.6 km line. The vertical axis time from 0 to 4 s. FIG. 6 is the horizontal component receiver gather of line 212 showing the moveout line for P—P arrivals. Linear movements lines corresponding to 1800 m/s are shown on the vertical component gather (FIG. 5) and lines corresponding to 3600 m/s are shown on the horizontal component gather (FIG. 6). These are the expected waveguide velocities for S-modes and P-modes respectively. Horizontally propagating S-modes will have a vertical polarization and therefore appear mainly on the vertical component gather while horizontally propagating P-modes will have a horizontal polarization and therefore appear on the horizontal component gather.

Figure 7:
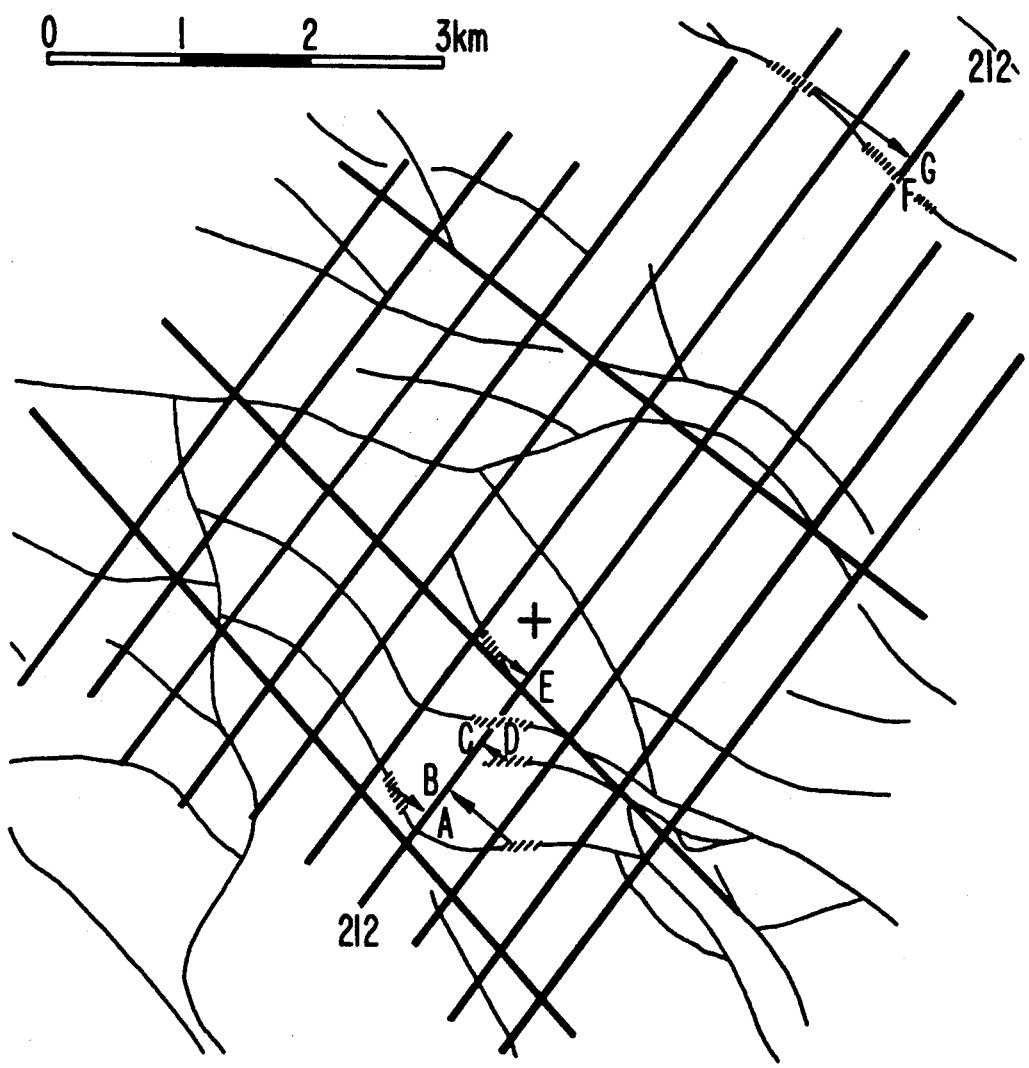
FIG. 7 is a survey layout diagram identifying faults.

FIGS. 5 and 6 show a number of arrivals that are successfully modelled by coupling between downgoing body waves and waveguide modes. Their curvature, the positions of their apices and their polarization are all consistent with the model. Note especially the correlation between linear moveout and polarization. Events with apices on the P-mode velocity line appear mainly on the horizontal component, while those along the S-mode line are stronger on the vertical component. P-mode and S-mode arrivals from the same coupling site are observed in some instances. The expected positions of sites of coupling (faults) based on the interpretation of the surface reflection data are shown in FIG. 7. FIG. 7 is a survey layout identifying faults acting as sources for the interpreted waveguide arrivals A to G. Thick lines show the surface source lines (airgun shot interval 26.7 m), thin lines show the traces of faults in the top Rotliegendes interface. The cross marks the position of the downhole geophone. Hashed segments indicate possible coupling sites and the arrows show where along Line 212 the arrival apices would appear. A good correlation exists between expected coupling sites and the positions of the arrival apices, lending further confidence to the interpretation of the arrivals.

This successful modelling of arrivals on Line 212 in terms of waveguide modes coupled to the downgoing wavefield has been repeated for other shotlines in the survey. No other plausible mechanisms for arrivals with these characteristics seems possible, so it is concluded that we can obtain usable field data for the proposed technique.

The analysis for the identification of arrivals and coupling site location can be refined in two main areas: firstly changing from a model in which everything is assumed to occur in the vertical plane beneath the line of shots (2-D) to a model in which downward propagation, coupling and waveguide propagation are not restricted to that plane (3-D) and secondly taking account of the (3-D) variable nature of overburden through which the downgoing wavefield passes.

Figure 8:
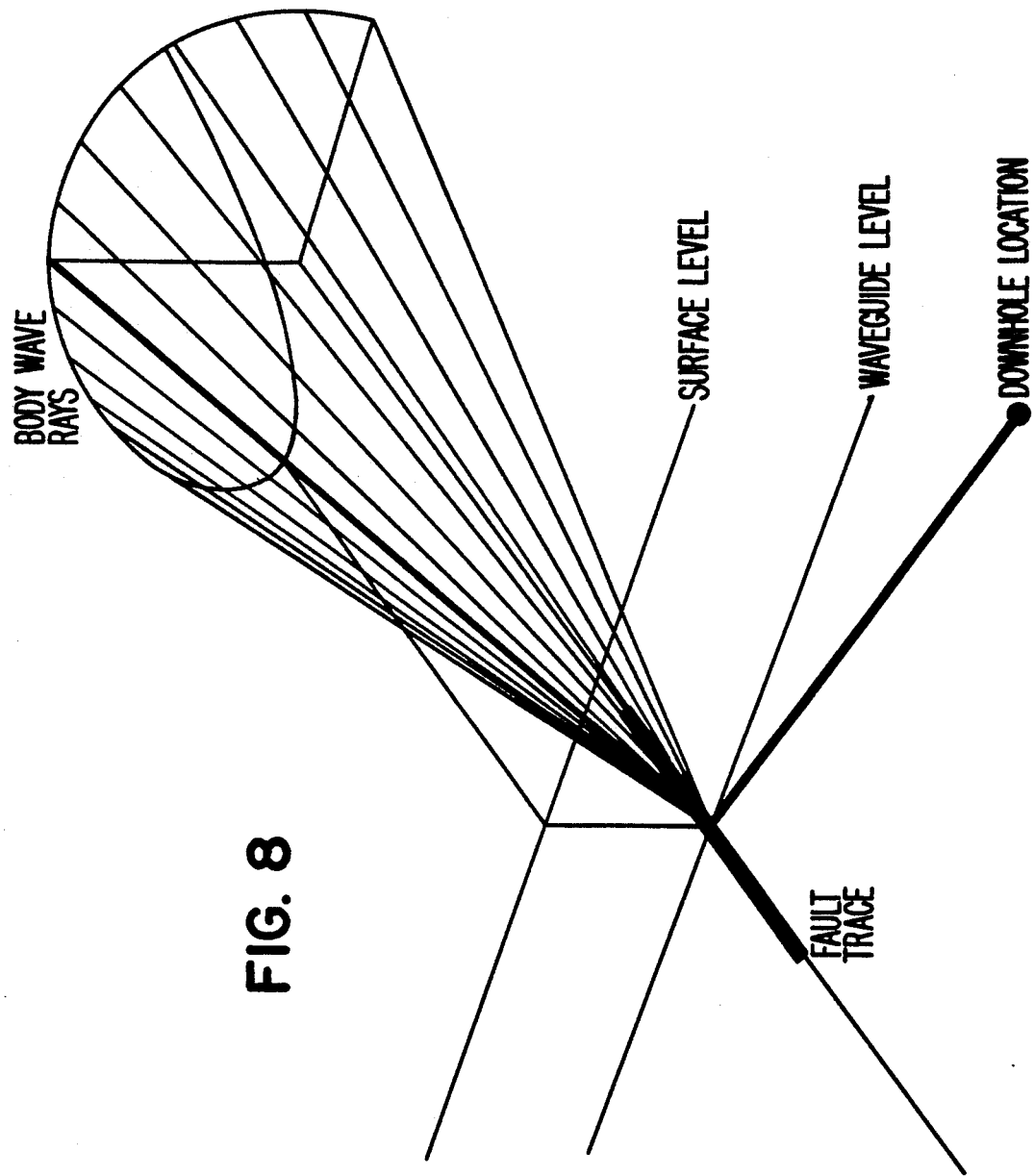
FIG. 8 is a ray diagram showing the relationship of incident and coupled waveguide rays.

Coherent radiation from a locally-linear set of coupling sites will be much stronger in certain directions than radiation produced by coupling at just one of the localized coupling sites. Linear superposition of in-phase radiations gives constructive interference. It is assumed that it is this coupling along a line that gives the observable arrivals on field data. In above-noted field example the lines are the intersections of near vertical faults with the roof of the waveguide. The realization that there is coupling along a line as opposed to coupling at a point has implications for the strength of excitation for modes propagating in different directions from the coupling sites. Only when the wavenumber of the waveguide mode (measured along the line of coupling sites) matches that of the incident downgoing radiation (also measured along the line of coupling sites) is the strength of the waveguide mode significant. There is therefore a form of Snell's law governing the relationship between the incident ray direction, the orientation of the line of coupling sites and the ray direction of the excited waveguide mode (FIG. 8). FIG. 8 is a ray diagram showing how the incident and coupled waveguide rays are related through the orientation of the line of coupling sites. Rays corresponding to body wave modes form a cone about the line of the fault segment. The angle $\phi$ between these rays and the fault segment and the angle $\theta$ between the fault segment and the ray from the downhole location are related through the propagation velocity of the waveguide mode $V_W$ and the body wave mode $V_B$. $V_W/\cos\theta = V_B/\cos\phi$. $V_W$ is always less than $V_B$ so $\theta$ is always greater than $\phi$. There can be no coupling if $\theta$ is less than arccosine($V_W/V_B$) (critical value of $\theta$) providing a constraint on the illumination of linear coupling sites. This relationship determines whether or not a segment of a fault trace is "illuminated" by a given acquisition geometry. If a particular segment (subject of a line of coupling sites) is orientated or positioned such that there is no wavenumber matching of downgoing body waves with the waveguide modes propagating to the downhole geophone, then that segment will not cause an observable arrival on field data. That segment is not "illuminated" by the survey and no information on it can be obtained from the survey. Conversely if one wants to observe a particular coupling segment, the survey needs to be designed so that it will "illuminate" a line of coupling sites with that position and orientation.

Propagation from the surface sources down to the waveguide must be modelled accurately. Approaches derived from established practice in the processing of surface reflection data can be used here. The downgoing wavefields usually propagate at high angles to the layering which allows one of a set of approximations to be made, depending upon the severity of lateral changes in the overburden velocity structure and the aperture represented by the surface array at the waveguide. For negligible changes with horizontal position of the depth to the waveguide and the velocity profile, as well as near-vertical propagation through the overburden, all propagation can be parameterized by a travel time for the vertical ray $T_o$ and a "normal moveout velocity" $V_{mo}$ giving travel time $T$ from a surface down to a coupling site on the waveguide by:

$$T^2 = T_o^2 + X^2/V_{mo}^2 \qquad (1)$$

where X is the horizontal offset of the source from the coupling site. If there are gradual changes in the depth to the waveguide and the velocity profile with horizontal position, propagation down to the waveguide can still be achieved with Equation 1 by using a $T_o$ and $V_{mo}$ which vary with position of the coupling site on the waveguide. More severe lateral changes in the overburden can be accommodated by adding an "image" ray correction in which the offsets X are altered as if the coupling site were moved laterally. Even stronger overburden variation and less vertical propagation requires ray-tracing through a model of the overburden and finally the use of an accurate wavefield extrapolation algorithm based on the wave-equation.

At least approaches can be adopted for the mapping of coupling sites. The first is a forward modelling approach in which the position of a trial coupling segment is moved around until a match is obtained between theoretical prediction and observation. However if a particular arrival can be successfully modelled by a fault in a certain position, it does not necessarily mean that there is a fault there. The data may also be successfully modelled by a fault in another position, and this possibility must be investigated. This is the problem of data ambiguity. The second approach to coupling site mapping involves inverting the data for the position of the fault segment. In this case ambiguity is represented by distributing the likelihood of a fault among more than one location. An image is created showing faults in all possible positions.

Figure 9:
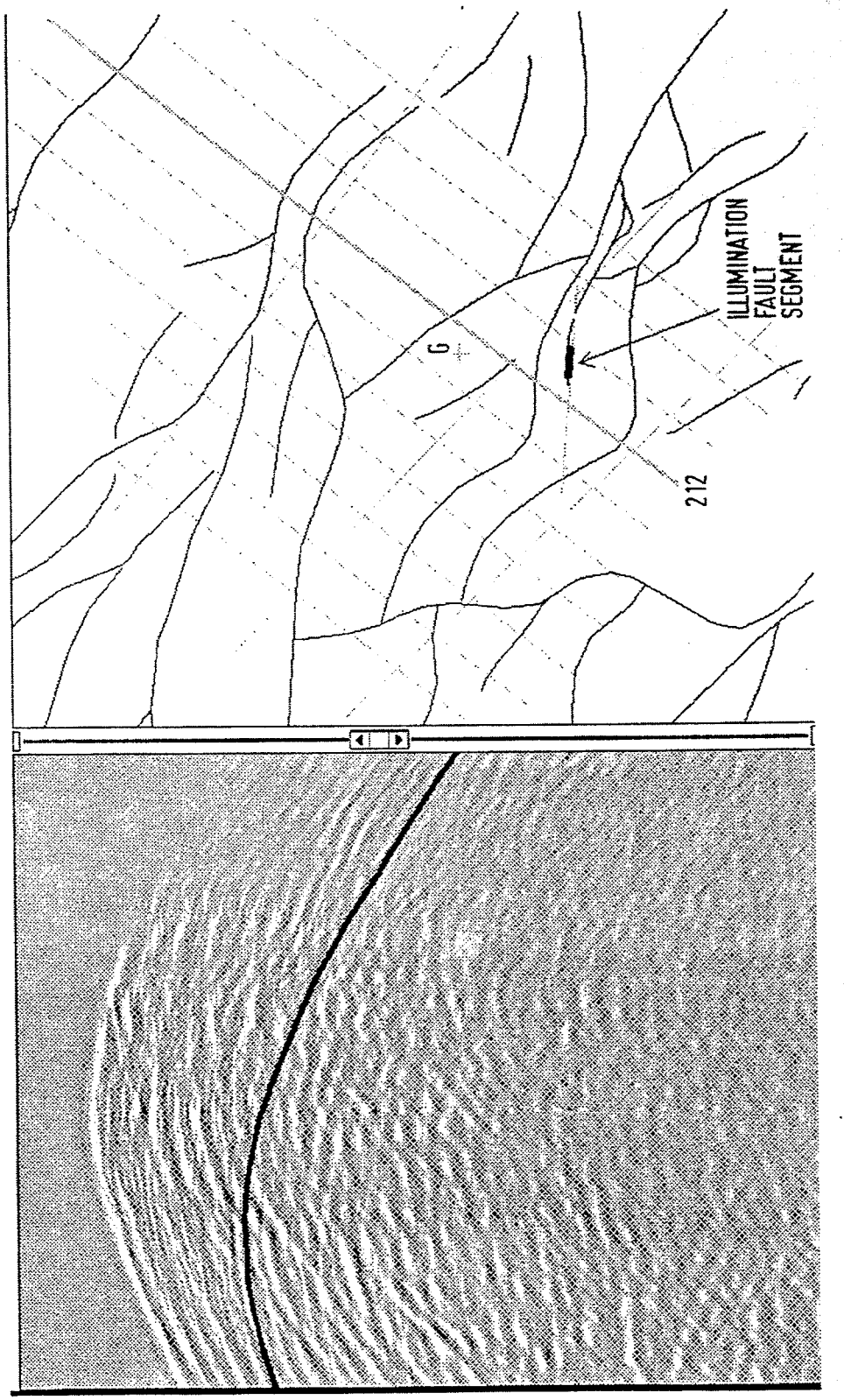
FIG. 9 is an illustration of a computer workstation display showing interactive modelling of waveguide arrivals.
Figure 10:
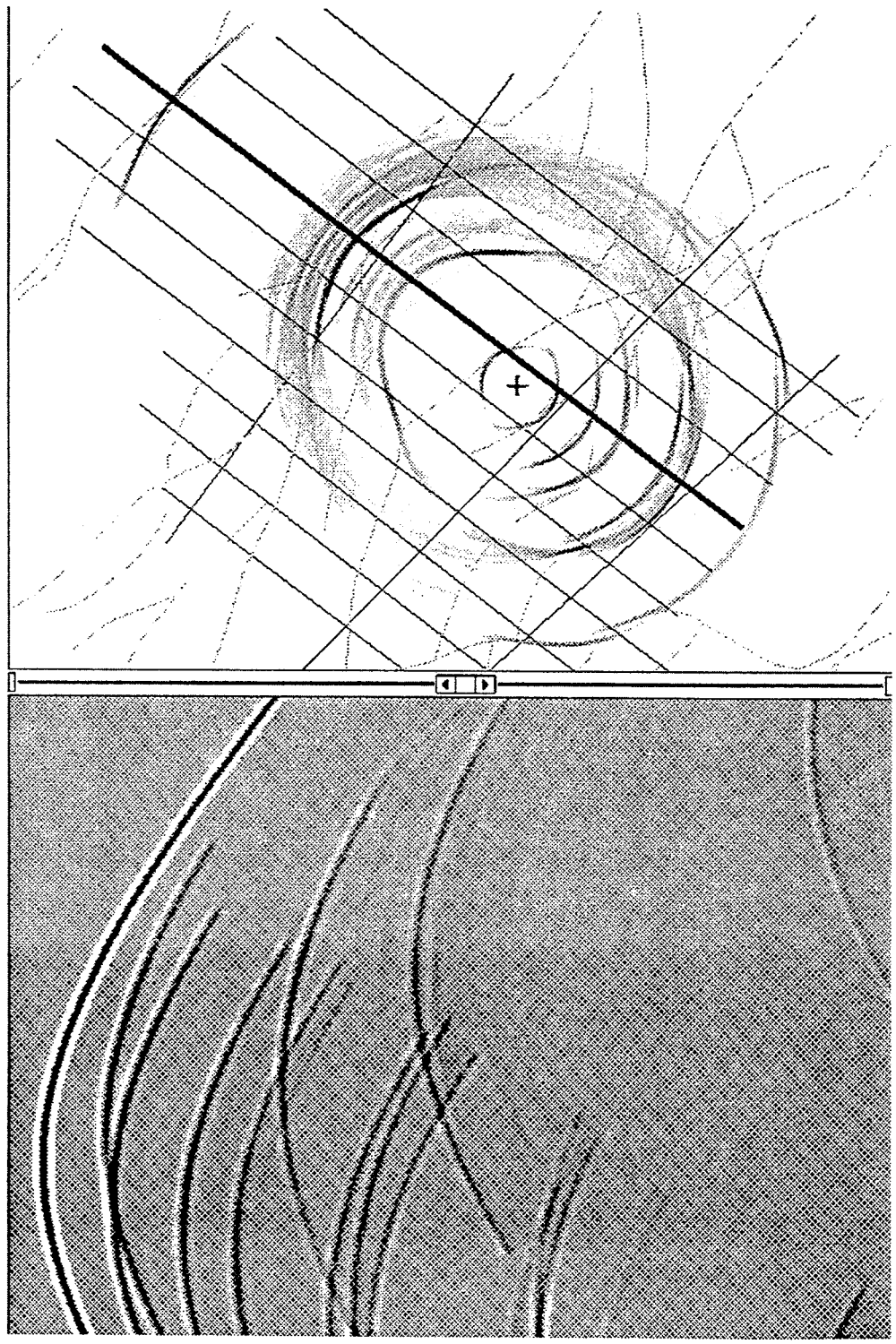
FIG. 10 is an illustration of a computer workstation display showing the generation of synthetic data from a distribution of faults.

The modelling approach relies on the insights of the geophysicist for rapid convergence as well as field data in which the desired arrivals are identifiable. It requires rapid modelling of each trial hypothesis and an interpretable display of the results for comparison with the field data. Applicants have implemented this in an interactive program that displays the hypothesis (a map of the waveguide with a movable coupling segment) alongside a display of the field data onto which the arrival times corresponding to the trial hypothesis can be superimposed for the purposes of comparison (FIG. 9). FIG. 9 shows how modelling of waveguide arrivals can be performed interactively on a computer workstation. The arrival times (left) for a user specified fault (right) can be superimposed on the data (left) for comparison with the times of observed arrivals. Synthetic seismograms corresponding to a set of line scatterers can also be generated (FIG. 10). FIG. 10 shows how synthetic data (left) can be generated from a distribution of faults (the thin light lines on the right hand panel). These data can then be compared with the field data to evaluate the model of the fault distribution. Shown here are synthetic P-S arrivals and the direct arrival (Gaussian wavelet, centre frequency 18.75 Hz, 1/e half-width 12.5 Hz) for shotline 212 (bold). The truncation of arrivals is due to a upper limit imposed on the source offset from the coupling site. These data can also be migrated (right) to reveal the zones of illumination given by the survey as well as the extent of ambiguity of data that would be obtained from the survey. The amplitude of the coherent diffraction stack of the analytic signal is displayed here. Dark areas on the migration (right) show where coupling is likely to have occurred. Comparison of the synthetic seismograms with the field data evaluates the model.

Inversion of the data for the distribution of coupling sites has also been implemented for the field data. Applicants have adapted a seismic process called "migration" to the model of arrivals resulting from the coupling of a downgoing body wavefield to waveguide modes along a locally-linear set of coupling sites. A variety of migration techniques are available, but it is the adaptation to waveguide arrivals and not the implementation method that is the salient point here.

One migration method is the "diffraction" stack in which each point in the "migrated" image is calculated by a summation of all data samples that correspond to the travel time that would be associated with a scatterer at the point. For applicants survey technique this involves taking positions on the waveguide (usually a rectangular grid) and summing the values of the seismic traces at the travel times for a coupling segment at that point. For each point on the waveguide in turn, the waveguide travel time to the point is calculated. Then for each surface source the travel time from surface to the waveguide point is added to give a total travel time. The seismic trace samples corresponding to these total travel times for each of the sources are added to give the value of the migrated image. Values related to the probability of coupling having occurred are thus obtained at a set of points on the waveguide to give a migrated image of the waveguide. This is done for each component receiver gather.

Applicants have made a further development to this migration technique. It involves the concept of "partial coherence" in the summation (diffraction stack). If the velocity structure of the overburden and waveguide is not known exactly, there will be errors in the travel times used in the diffraction stack. These errors cause a degradation of the migrated image in that the signal-to-noise ratio decreases, resolution decreases and features can be mis-positioned.

The diffraction stack is usually applied to the recorded signal. It is possible, however, to compute the "analytic" signal from a real seismic trace. The analytic signal has complex sample values whose real part is the recorded signal and whose imaginary part is the Hilbert Transform of the real part. If the magnitude of the complex number (analytic signal) is taken we get positive real numbers which form the "envelope" of the seismic trace. For a band limited transient pulse (the seismic pulse) the envelope of the trace falls off more slowly than the real signal as one moves away from the peak of the pulse. It also never changes sign, so cancellation (destructive interference) never occurs on the addition of more values. If the envelope of the seismic trace is used in the diffraction stack (incoherent migration) instead of the real signal (coherent migration), the migrated image in the presence of random timing errors has a higher signal-to-noise ratio but lower resolution. There is a trade-off between signal-to-noise and resolution.

In practice timing errors (between our model of the velocity structure and reality) are expected to be similar for neighboring source positions, becoming less similar for two positions that are further apart. It is describe to perform a coherent summation of the signal while errors are similar (to improve resolution) but it is necessary to use an incoherent summation when errors become unrelated in order to get a higher signal-to-noise ratio for the sum. This can be done by making use of the fact that the errors have an effective correlation distance. Traces from sources less than the correlation distance apart can be usefully summed in a coherent way, while more separated sources are best summed incoherently. This has been implemented in our diffraction stack migrations. For traces corresponding to a straight line of surface sources, a window of length equal to twice the effective correlation distance is run along the line. For each position of the window, the coherent summation of the appropriate time samples is performed by adding the complex numbers (analytic signal). The amplitudes of these (complex) sums are then accumulated as the window runs along the line. The final accumulated value is the value of a "partial coherent" migration at that position on the waveguide.

The coherent window size is decided by a trade-off between resolution and signal-to-noise ratio. The chosen balance is a function of the timing error statistics (variance, correlation distance and degree of stationarity), the seismic wavelet shape (its dominant frequency, bandwidth) and the relative importance of resolution and signal-to-noise ratio to the geophysicist.

Another approach to migration involves the use of "wavefield propagators". Given a recording of a wavefield at one set of positions, it is possible to calculate what would have been recorded at another set of positions. Migration can be performed by extrapolating the recorded wavefield to the zone of interest and applying an imaging condition. Imaging can involve extracting the extrapolated received wavefield data at the time at which the source wavefield would have arrived (excitation-time imaging condition). Alternatively the extrapolated received wavefield is cross-correlated with the source wavefield. The source wavefield is obtained by extrapolating the seismic excitation out from the source position to the zone of interest. The latter is more robust with respect to noise but it does require knowledge of the source excitation.

The adaptation necessary to migrate coupled waveguide modes involves using body wave extrapolation to model propagation from the surface to the waveguide and using a waveguide model for the propagation from coupling site to downhole geophone. For the surface source to downhole triaxial geophone acquisition geometry it is most convenient to invoke the seismic reciprocity theorem and migrate the common-receiver gathers as if they were traces recorded by pressure transducers on the surface listening to seismic sources in the waveguide. Each component receiver gather can then be migrated by extrapolating the wavefield recorded at the (notional) surface array down to the waveguide. An imaging condition can then be applied to obtain the migrated image from the extrapolated traces.

If the waveguide is not significantly dispersive and the source signature is not well known, the value of the migrated image can be taken as the extrapolated data sample at the travel time for waveguide propagation. If the source excitation is known imaging could be done by a cross-correlation of the extrapolated data with the source signature delayed by the waveguide travel time. If the waveguide is dispersive (travel time changes with frequency), the dispersed nature of the arrivals on downward extrapolated data must be taken into account. Knowledge of the dispersion relation for the waveguide mode is necessary. Recompression of the downward extrapolated traces (based on their distance from the downhole geophone and the dispersion relation) would then allow application of a conventional excitation-time imaging condition. Alternatively the dispersion could be modelled in the extrapolation of the (notional) source excitation out from the downhole position and a cross-correlation of the two wavefields would generate the migrated image.

Figure 11:
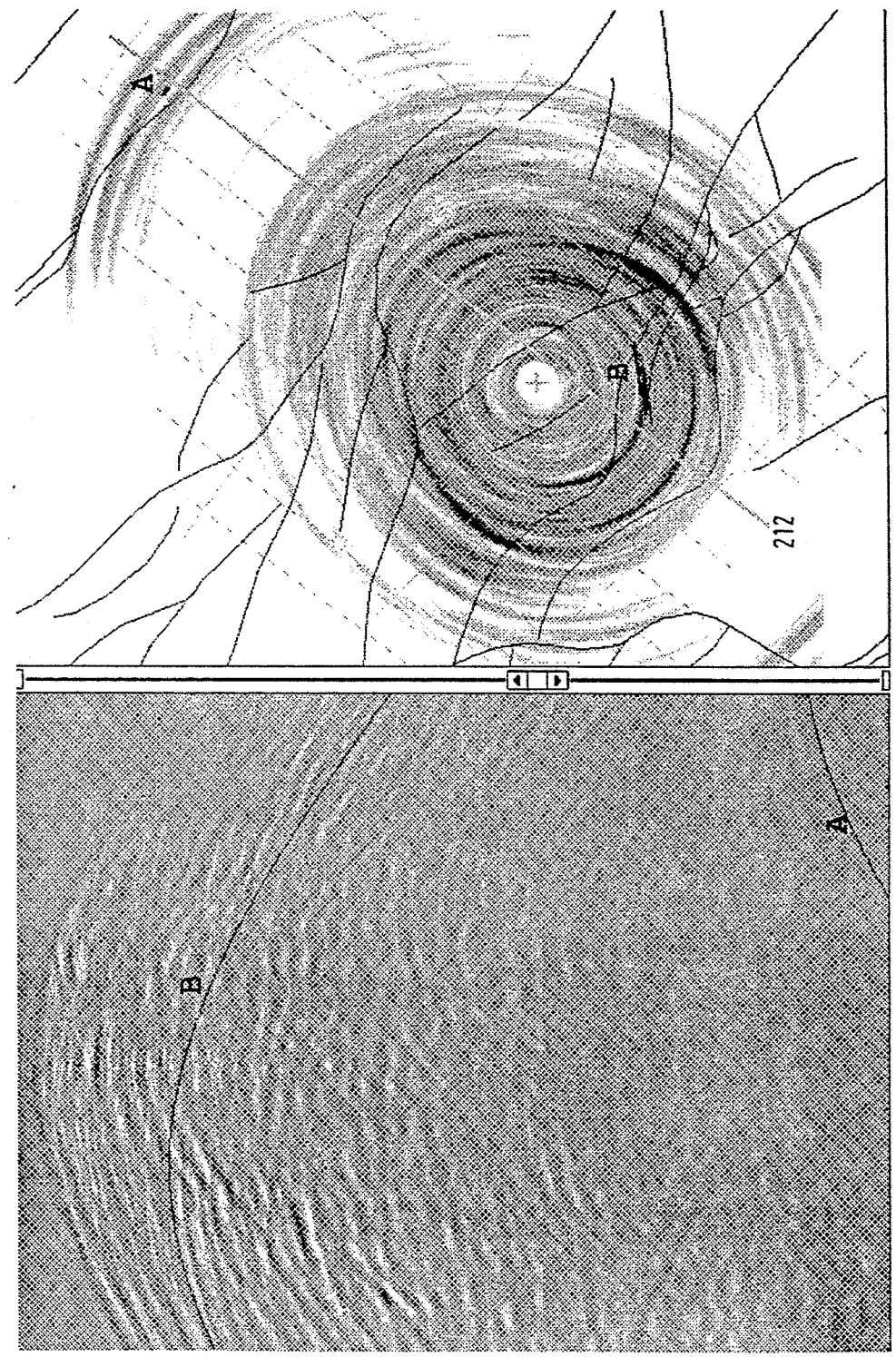
FIG. 11 is an illustration of a computer workstation display showing generation of a migration image for the vertical component of geophone response for line 212 of FIG. 2.

FIG. 11 illustrates partially coherent diffraction stack migration of the vertical component of Line 212 for P-S waveguide arrivals. The input data are displayed on the left and the migrated image on the right. Connections between features on the migration and the arrivals that generate them can be established by modelling. The letters A and B, for example, mark interactively specified fault segments and their corresponding arrival times. The coherent window in the migration was 25 traces wide.

Figure 12:
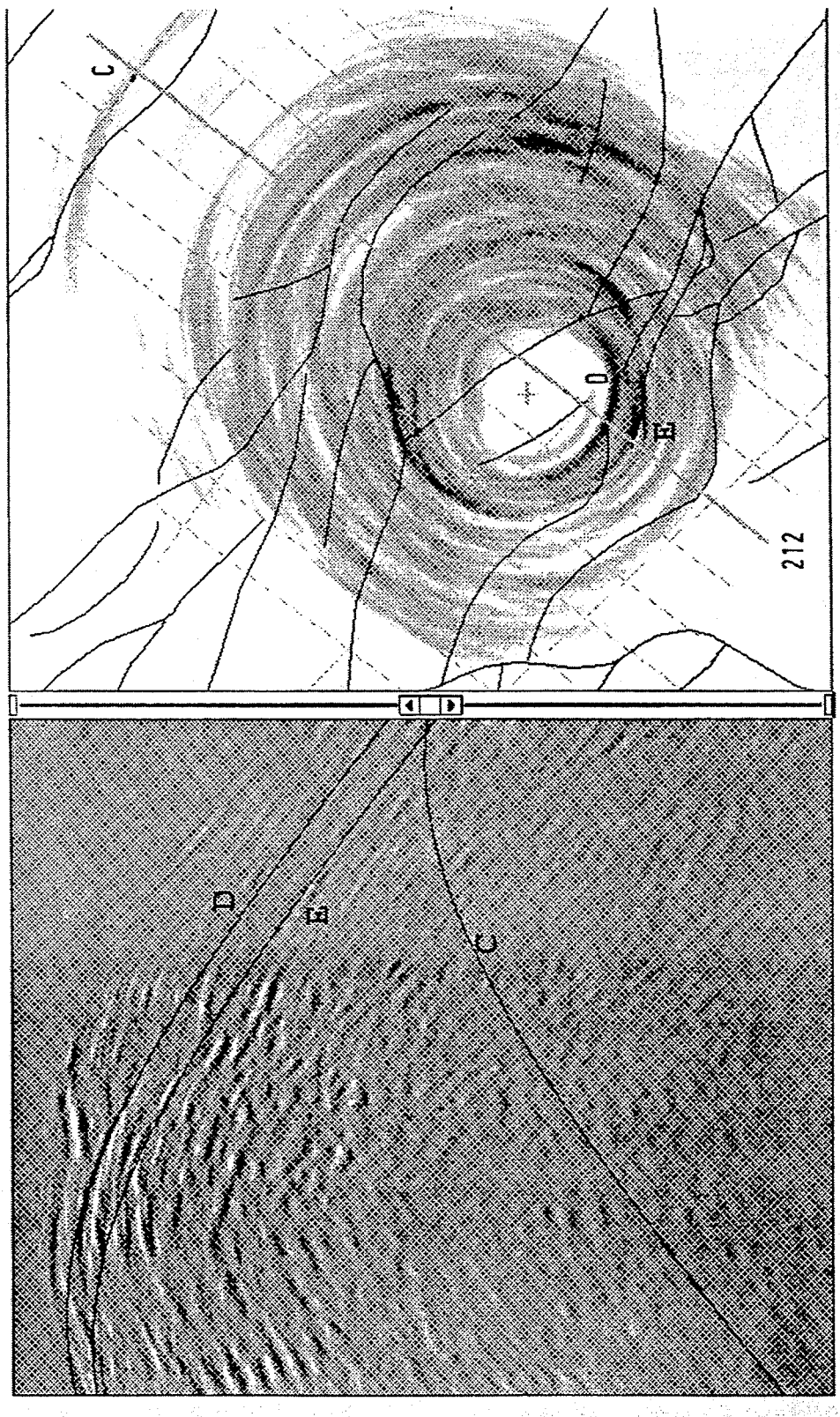
FIGS. 12(A)–12(B) are illustrations of a computer workstation display showing the generation of a migration image for the horizontal components of geophone response for line 212 of FIG. 2.
Figure 12:
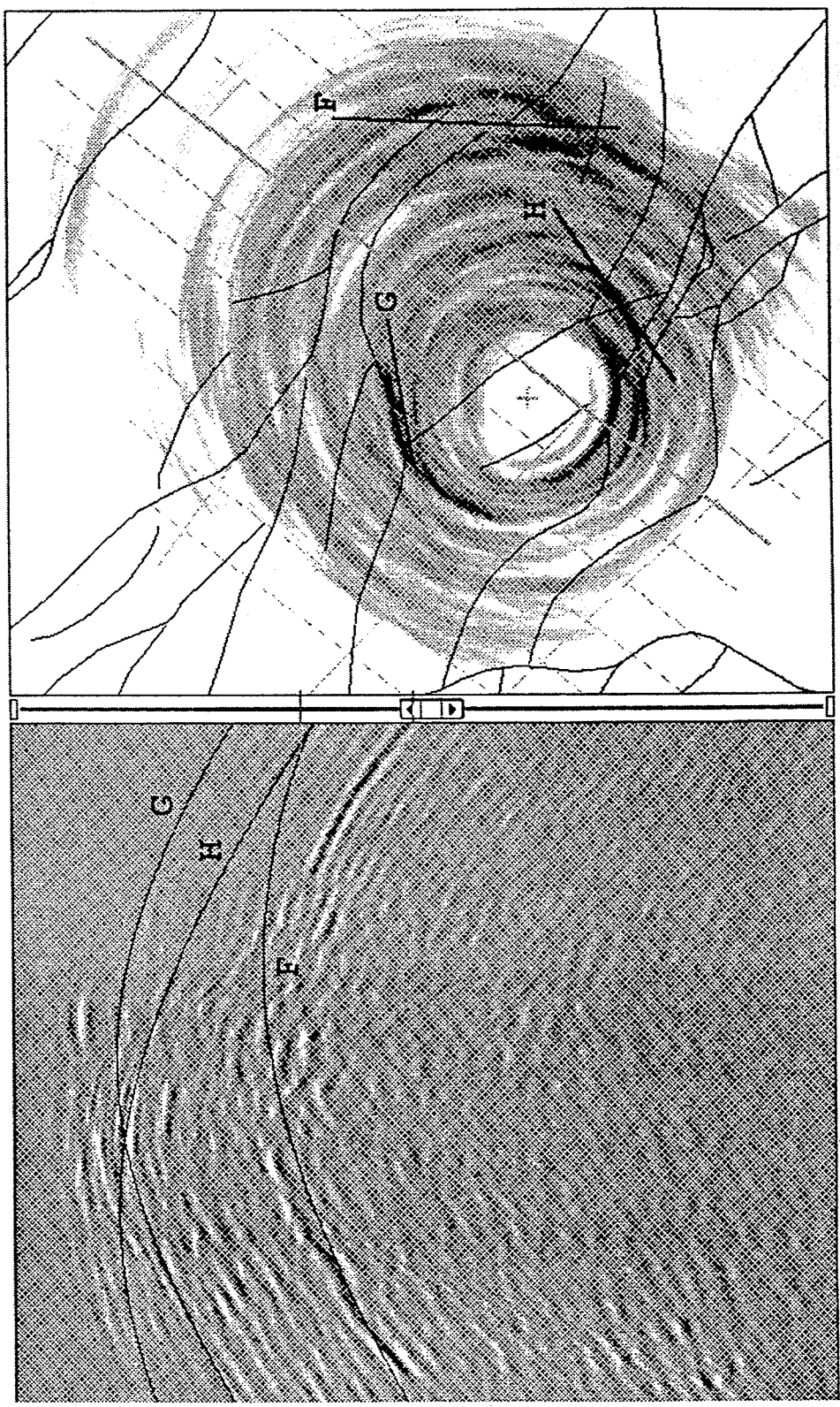

FIGS. 12(A)–12(B) illustrate partially coherent diffraction stack migration of the horizontal components of Line 212 for P—P waveguide arrivals. Both the horizontal components are used in the migration. For each possible coupling location the data is projected onto the expected polarization for an arrival from that direction. The migration will be dominated by the inline component close to the shotline whereas the parts of the image close to a line through the geophone and perpendicular to the shotline will be dominated by the crossline component. Hence in FIG. 12(A) the migrated image (right) with the inline component (left) when looking at features along the shotline (C, D and E) is displayed and in FIG. 12(B) the crossline component while investigating features off the shotline (F, G and H) is displayed. Features like (F) that do not correspond well with identifiable waveguide arrivals on the data need to be interpreted with caution. In both cases (FIGS. 11 and 12(A)-12(B) travel times from the surface sources to the positions on the waveguide were computed for P body waves. A laterally invariant flat layered overburden model was used. Arrivals identified on the field data do not seem significantly dispersed, so a single waveguide propagation velocity was used for all frequencies. The waveguide propagation velocity used in the P—P migration was that for a compressional waveguide mode (P) in the Rotliegendes sandstone and waveguide, and the waveguide velocity used in the P-S migration was that for a vertically polarized shear mode (sv). The vertical component gather was used in the P-S migration since SV waveguide modes arriving at the downhole geophone would have a vertical polarization. The P—P migrations used both the inline and crossline horizontal components in a projection onto the expected polarisation for an arrival from each waveguide position to get the signal. A partial coherent summation (25 trace window) of the analytic signal was performed to give the migrated value.

The migrated images show coupling sites suggested by the data. Possible coupling sites can be compared with faults as mapped from the surface reflection data (FIG. 2). Correlation is good in several instances, despite the over-simplified model of the overburden that was used in the migrations. The modelling capabilities of the interactive program can establish relations between features on the migration and arrivals on the data.

The coupled waveguide arrivals can be modelled by a linear system. First the source excitation $S(\omega)$ (S is complex and is the frequency) passes through the overburden as a body wave mode. This is more than a simple delay since attenuation effects and the lensing effects of propagating through an inhomogeneous overburden must be modelled. This filter can be modelled variously by a flat layered system, a 3-D inhomogeneous space under the ray (high frequency) approximation or a 3-D inhomogeneous space using wavefield propagators with various accuracies and ranges of applicability. For each source position, propagation through the overburden can be described by the transfer function $H_O(\omega)$ where H is complex. Next the coupling with the waveguide must be modelled. The geometry of the feature responsible for the coupling, the seismic velocity and density and the wavelength and incident direction all effect the coupling, but again the coupling to the waveguide mode that then propagates to the geophone can be described by a transfer function $H_C(\omega)$. Next the waveguide propagation to the borehole is modelled. In general it is more than a simple time delay. The waveguide transfer function depends on the velocity and density profile of the waveguide, the mode being considered as well as any intervening features (departures from planarity) along the propagation path. Finally the geophone response forms a filter $H_G(\omega)$, which depends on the tool coupling to the borehole, the geophone orientation with respect to the waveguide mode polarisation and the geophone itself. This model of the seismic trace $R(\omega)$ can be summarised as:

$$R(\omega) = H_G(\omega) H_W(\omega) H_C(\omega) H_O(\omega) S(\omega) \qquad (2)$$

Applicants are interested in extracting $H_W(\omega)$ and $H_C(\omega)$. For an arrival on a common-receiver gather the $H_G$ and $H_W$ terms are constant while $H_C$, $H_O$ and S vary with source position (trace number). $H_G$ can normally be reconstructed using the geophone tool manufacturer's specifications, the assumption that coupling to the borehole wall is firm and the orientation of the tool, leaving $H_W$ as the invariant part of R. S may be modelled using knowledge of the acquisition parameters and $H_O$ is obtained during the migration of the data. This leaves $H_C$ as the unknown and variable effect on R. If either $H_C$ or $H_W$ are known, the other can be solved for from R using Equation 2.

If arrivals from the same coupling sites were observed in two or more boreholes, and the assumption is made that the waveguide propagation characteristics are spatially invariant, then it becomes possible to solve directly for $H_W$. Alternatively $H_W$ may be modelled using knowledge of the velocity and density profiles of the waveguide (obtained from well-logs). In the example below, the undispersed character of arrivals observed on the field data allowed us to make the assumption that the waveguide mode propagation velocity is independent of frequency (within the bandwidth of the data). This in turn suggests that the waveguide mode propagation velocity can be well approximated by the appropriate body wave mode (P or SV) propagation velocity along the axis of the low velocity layer. This velocity was inferred from the well-logs (sonic and density).

Additional constraints can be inferred from analysis of migration focussing and the timing of P and S waveguide modes that have been scattered from the same coupling sites. If possible coupling sites are sparsely distributed, one can identify such corresponding arrivals. They have a common propagation time from surface source to waveguide, so the difference in arrival time can be attributed to the difference in their waveguide propagation velocities. If the position of the coupling sites is known, the arrival times would give the waveguide velocities directly. In practice, however, knowledge of the coupling site depends on knowledge of the waveguide velocities, so an iterative approach is used. The data will be migrated with different waveguide velocities until optimal focussing occurs. In the absence of corresponding P and S arrivals creating corresponding features on the respective migrations, the evaluation of focussing is highly subjective. It usually involves choosing the migrated image showing maximum contrast and the minimum spread of features. Corresponding P and S features provide the additional constraint that they must occur in the same position.

Given $H_W$ one can solve for the coupling transfer function $H_C$ from the data R on the basis of Equation 2. Inversion of $H_C$ for features of the departure from planarity is poorly constrained, but the use of additional knowledge allows inferences to be made. A geological model can provide a likely form for the features. In the example below, the coupling sites are assumed to be steps in the roof of the waveguide caused by near vertical faults intersecting the base Zechstein/top Rotliengendes interface. Well-logs can provide reasonable values for the material properties. The salient feature in this model is the height of the step in the roof (throw of the fault).

Current knowledge of elastic scattering and waveguide mode propagation would allow the modelling and constrained inversion of $H_C$ for the throw of faults and other parameters of models of the coupling. Applicants demonstrate an empirical relationship between fault throw and $H_C$ in the above-noted field data example. Having demonstrated that variations in $H_C$ can be obtained from field data, current knowledge is sufficient to allow that modelling and constrained inversion are possible.

Figure 13:
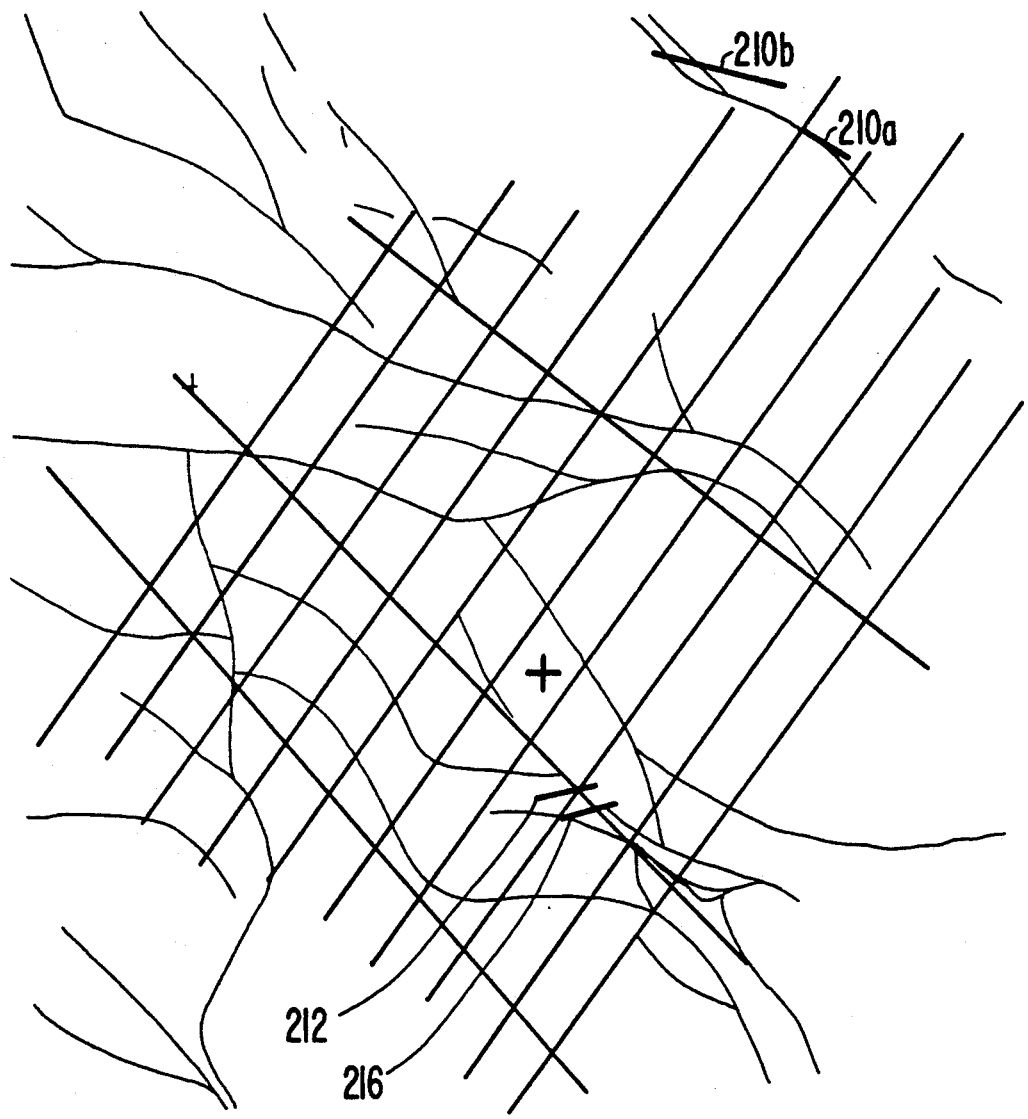
FIG. 13 is a survey layout map.

In order to relate the arrival character observed on the field data to the throw of faults (as mapped from surface) four pairs of corresponding P and S wave arrivals were selected. The arrivals were chosen on the basis of being among the most prominent fault generated arrivals, as well as belonging to a fairly unambiguous pairs of corresponding P and S arrivals. An interactive modeller program was used to establish probable mode conversion sites (segments of faults). The survey layout, fault traces in the Rotliegendes and S mode conversion sites corresponding to the arrivals are shown in FIG. 13. FIG. 13 is a map showing the survey layout (medium lines), the traces of faults in the Rotliegendes as mapped from surface seismic data (light lines) and the specular mode conversion sites responsible for the S arrivals to be examined (darkest lines). The specular mode conversion sites (or "illuminated segments" for P arrivals are slightly extended versions of those shown because of the higher post-conversion velocity. The specular mode conversion sites were modelled using the "Interactive Modeller" program on the assumption of a uniform image-ray travel time of 843 ms and a constant normal moveout velocity of 3857 m/s. These figures were obtained from the least-squares best fit of a hyperbolic sheet to all direct arrival travel times in the survey. Waveguide velocities of 3600 m/s and 1800 m/s were used for P and S arrivals respectively. Modelling identifies the faults responsible for particular arrivals. Corresponding P and S arrivals originate from the same site, except the specular P mode conversions take place along a greater length of the fault because of the higher post-scattering velocity. The two pairs of arrivals selected from Line 210 correlate with different segments of the same fault. The arrivals from Line 212 and Line 216 are modelled as coming from close but not coincident fault segments. There are no other prominent arrivals sufficiently close by to allow the problem to be resolved by changing the association of arrivals between lines. Using the crossline 201, the arrivals can in fact be connected and thus identified as one and the same. The apparently different conversion sites for different parts of the same arrival suggests that distortion by the overburden has rendered the modelling procedure inaccurate. Nevertheless the possible faults reponsible for this arrival can be identified, allowing the identification of possible throws. The faults in the region of the modelled mode conversion sites for Lines 212 and 216 have throws of about 30 m. The fault corresponding to the mode conversion sites for Line 210 has a throw of 300 m.

Figure 14:
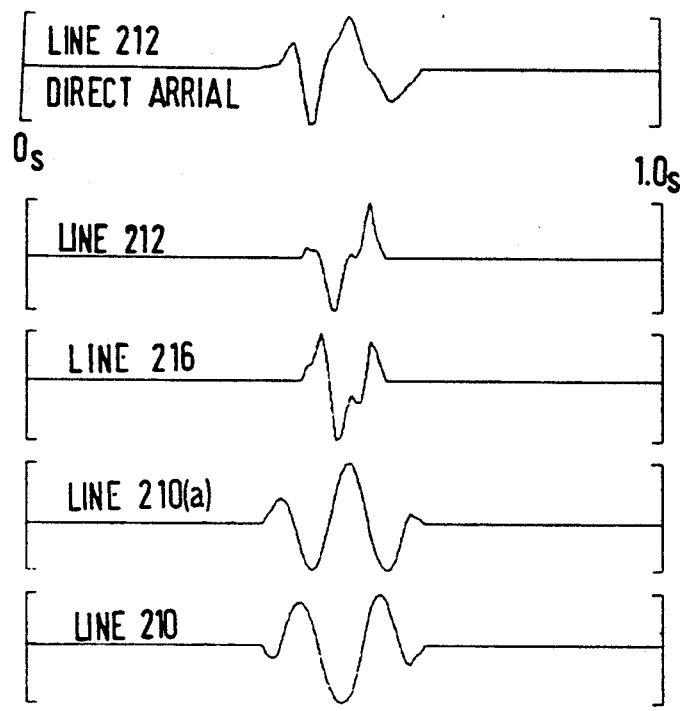
FIG. 14 is a set of P-wave signatures obtained from the survey illustated in FIG. 13.
Figure 15:
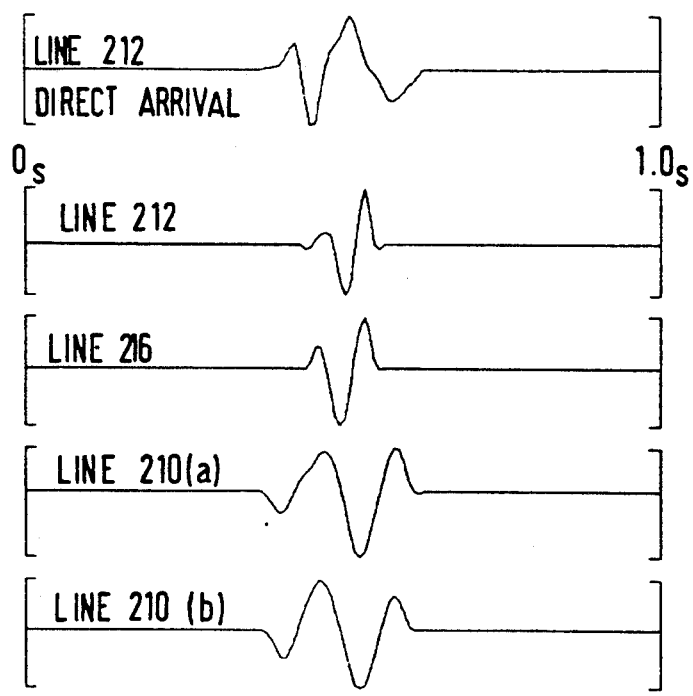
FIG. 15 is a set of S-wave signatures obtained from the survey illustrated in FIG. 13.
Figure 16:
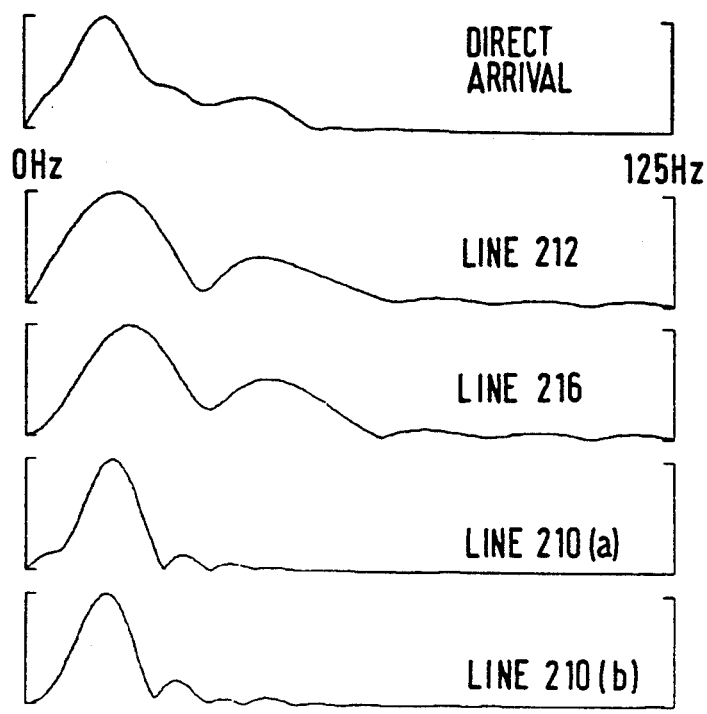
FIGS. 16 and 17 are the amplitude spectra of the P-wave and S-wave arrivals respectively.
Figure 17:
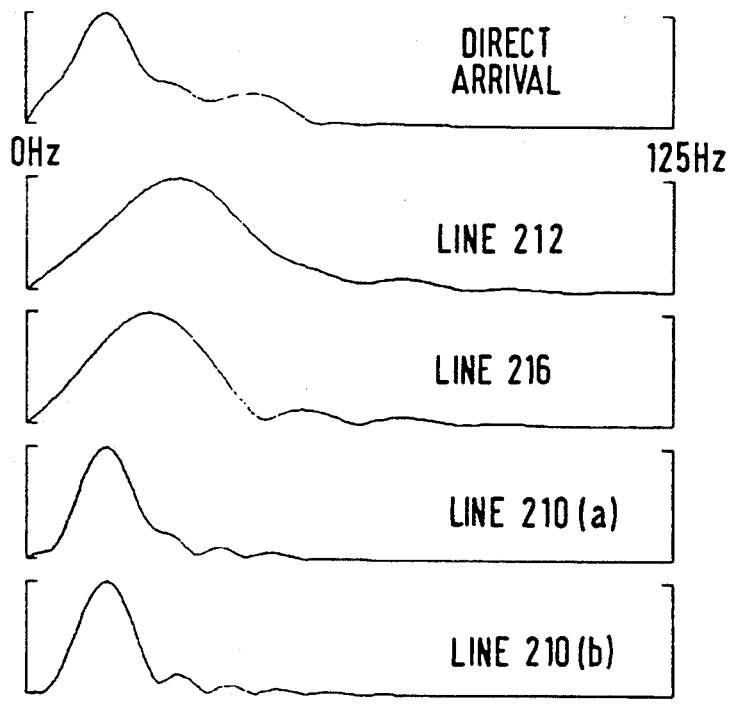

The windows of data around the arrivals were flattened and the signature (time behaviour) of the arrival was extracted by a Principal Components Analysis (PCA). Singular Value Decomposition (SVD) was used to compute the Karhunen-Loève (KL) transform of the flattened data. Flattening on the chosen arrival causes the common signal between traces to concentrate in and dominate the first principal component. Crossing energy is more evenly distributed between the principal components. The extraction of common signal is better than stacking if the traces have uniform noise levels, variable signal levels and alignment errors. Only in the case of highly variable noise levels is the stack more robust. The first trace of the KL transform (first PC) is a least-squares best fit trace to the gather traces, in which the freedom of scaling is permitted in the fits to each trace in the gather. FIG. 14 shows the P-arrival signatures (extracted from the horizontal component receiver gathers) and FIG. 15 shows the corresponding S-arrival signatures. Fairly narrow windows around the events were taken into the PCA in order to increase the signal-to-noise ratio. FIGS. 16 and 17 show the amplitude spectra. The direct arrival at the downhole geophone for a clean part of Line 212 is shown for the purposes of comparison for each of FIGS. 14 to 17. The signatures from Lines 212 and 216 which correspond to scattering from a small fault (30 m throw) are considerably richer in higher frequencies than the signatures derived from Line 210 which correspond to scattering from a large fault (300 m throw). This pattern is true for both the P and the S wave arrivals. More subtle character differences relating mainly to the phase are observed between corresponding P and S arrivals.

Comparison with the direct arrival shows the small fault signatures to be a high-pass filtered version of this direct arrival and the large fault signatures to be a low-pass filtered version of this direct arrival. The window used to derive the direct arrival signature was chosen to avoid the more complicated parts of the overburden. Consequently faults illuminated through straightforward parts of the overburden (without buried focii or strong heterogeneity) would receive an incident wavelet similar to that obtained from the selected window of the direct arrival. The travel paths from the surface shots (corresponding to the windowed data) to the two faults studied here were indeed through less complicated overburden so it is an acceptable assumption that these faults were irradiated with the observed direct arrival wavelet.

The following simplifying assumptions were made: Since the arrivals do not appear to be dispersed on the field data it is assumed that the waveguide transfer functions are simply delayed spikes (in the time domain). Since the data show no indication of noise due to poor coupling and the data bandwidth lies well within the design range of the tool, it is assumed that the tool response is a spike at zero time. In the frequency domain these assumptions are expressed as $|H_W(\omega)| = |H_G(\omega)| = 1.0$ for all $\omega$).

The arrival signatures can then be interpreted in terms of fault transfer functions $H_C(\omega)$. The fault transfer function is that which converts the incident P-wave $I(\omega)$ (direct arrival signature) into that which is recorded in the waveguide $R(\omega)$ (P and S-arrival signatures). In the frequency domain:

$$H_C(\omega) = \frac{R(\omega)I^*(\omega)}{I(\omega)I^*(\omega) + \epsilon} \quad (3)$$

Figure 18:
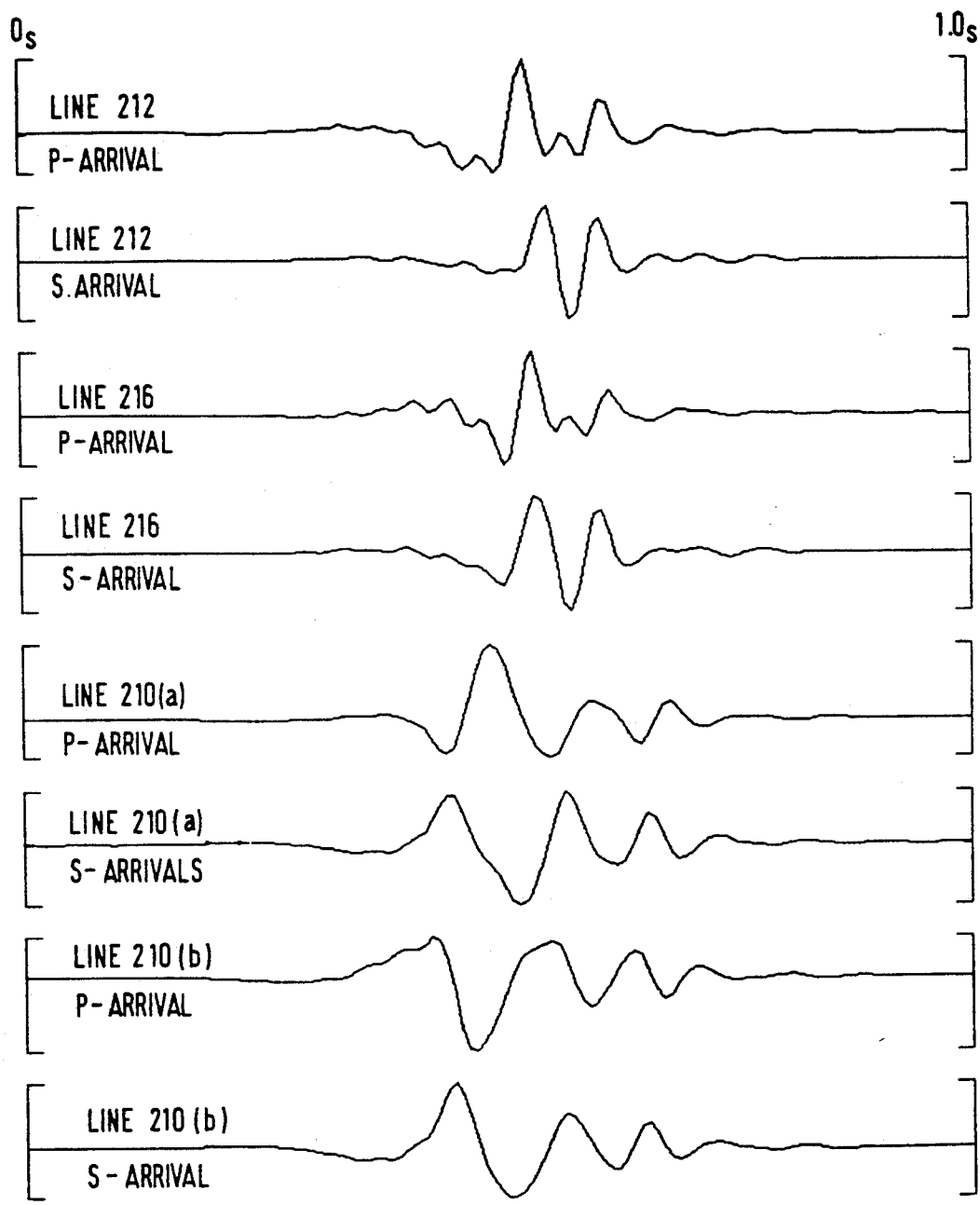
FIG. 18 is a set of time domain transfer functions appropriate to the survey of FIG. 13.
Figure 19:
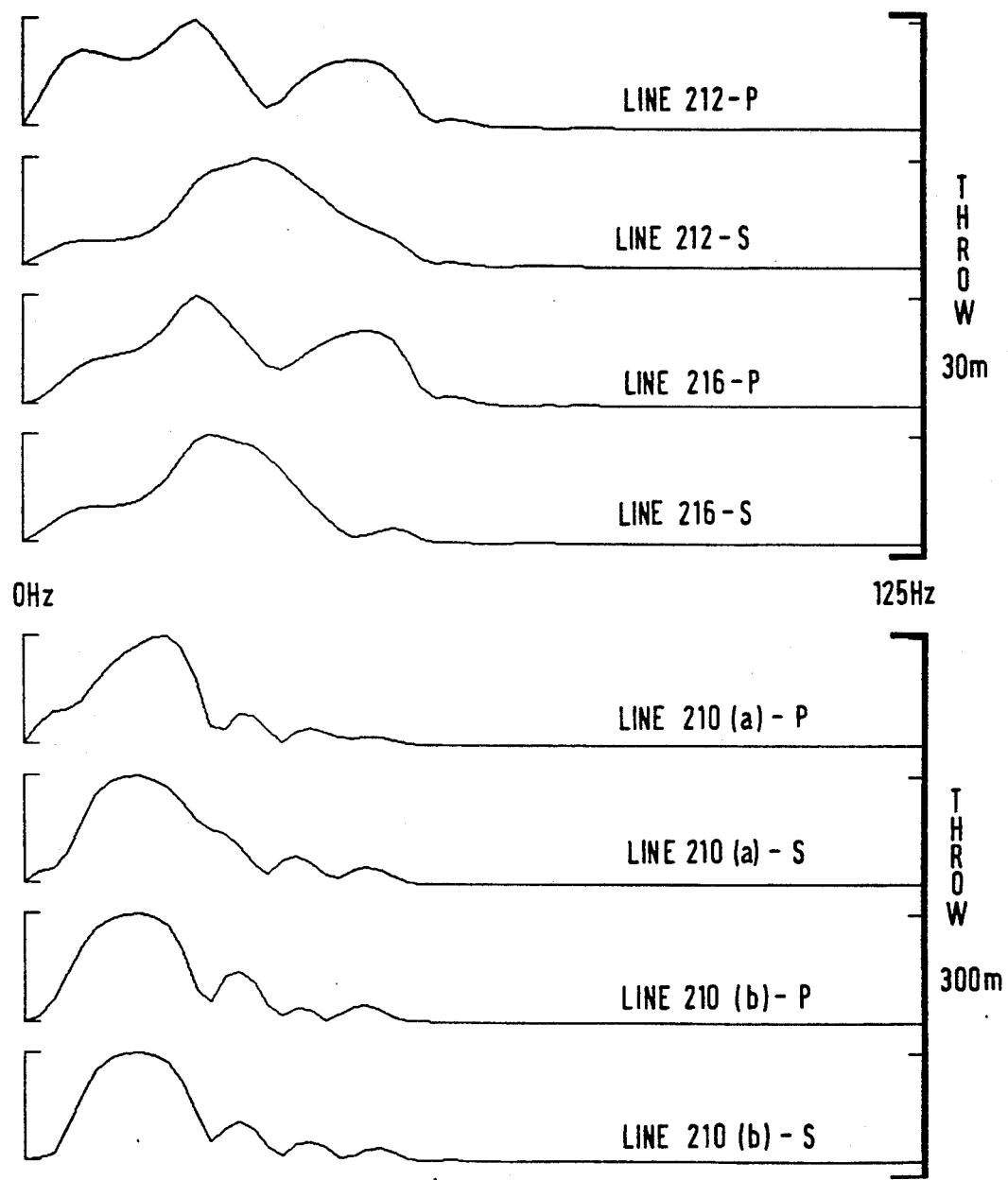
FIG. 19 is a set of amplitude spectra of the transfer functions.

The superscript * denotes the complex conjugate and $\epsilon$ (small and positive) represents white noise added to stabilize the calculation for frequency components that are very small in the autocorrelation of the input ($I(\omega)I^*(\omega)$). The signatures were padded with zeros to improve sampling in the frequency domain and complex DFT of the signatures were performed. The resulting transfer functions are shown in the time domain in FIG. 18 and in the frequency domain in FIG. 19. The amplitude spectra show that (to first order) the small fault acts as a bandpass filter centered around 30 Hz while the large fault acts a bandpass filter centered on about 15 Hz.

REFERENCES

1. Aki, K and Larner, KL, 1970, Surface motion of a layered medium having an irregular interface due to incident plane SH waves. Journal of Geophysical Research (JGR) 75, 933–954.
2. Albright, James N and Johnson, Paul A, 1990, Cross-borehole observation of mode conversion from borehole Stoneley waves to channel waves at a coal layer: Geophysical Prospecting, 38, 607–620.
3. Downey, MW, 1990, Faulting and hydrocarbon entrapment: The Leading Edge, 9, 20–22.
4. Hardage, BA, 1985, Vertical Seismic Profiling—Part A: Principles: Handbook of Geophysical Exploration, Section 1: Seismic Exploration, 14A. Geophysical Press, London-Amsterdam.
5. Hill, NR and Levander, AR, 1984, Resonances of low-velocity layers with lateral variations: Bulletin of the Seismological Society of America (BSSA), 74, 521–537.
6. Levander, AR and Hill, NR, 1985, P-SV resonances in irregular low-velocity surface layers. BSSA 75, 847–864.
7. Menke, WH and Richards, PG 1980, Crust-mantle whispering gallery phases: A deterministric model of $P_n$ wave propagation. JGR 85, 5416–5422.
8. White, JE 1983, Underground Sound: Application of seismic waves. Methods in Geochemistry and Geophysics, 18. Elsevier, Amsterdam-Oxford-New York.

We claim:

1. A method of seismic surveying which utilizes a seismic waveguide in the earth wherein a first region is defined as the region within the waveguide and a second region is defined as the region outside of the waveguide, the method consisting of generating seismic energy by means of one or more energy sources situated in one of said regions; detecting seismic energy which leaks by energy coupling from one of said regions to the other of said regions; detecting seismic energy by means of one or more transducers in the other of said regions and analyzing the detected seismic energy to locate localized deviations in the planarity of the waveguide which give rise to said energy coupling.

2. The method claimed in claim 1 wherein said one region is the region outside the waveguide and said other region is the region inside the waveguide, the seismic energy being generated by one or more sources at or near the surface of the earth and being detected by one or more geophones in one or more boreholes within the waveguide.

3. The method claimed in claim 1 wherein said one region is the region inside the waveguide and said other region is the region outside the waveguide, the seismic energy being generated by one or more sources in one or more boreholes within the waveguide and being detected by one or more geophones at or near the surface of the earth.

4. A method of seismic surveying as claimed in any one of the preceding claims wherein a plurality of seismic traces is derived, each being in respect of seismic energy transmitted between a position in the waveguide and a respective position outside the waveguide, and wherein a model is applied to the traces to determine energy transmitted by said energy coupling, the model assuming that coupled energy has a transmission time comprising two components consisting of a constant time component within the waveguide and a variable downgoing time component outside the waveguide, wherein the downgoing time component is a function of the horizontal offset of the respective position outside the waveguide from an energy coupling site at the waveguide.

5. A method of seismic surveying is claimed in claim 4 wherein the position of the energy coupling site is determined by analysis of the time components for the different seismic traces.

6. A method of seismic surveying as claimed in claim 5 wherein frequency analysis of the received seismic energy is performed to determine the relationship between phase velocity and frequency for propogation within the waveguide.

7. A method of seismic surveying as claimed in claim 6 wherein the said relationship between phase velocity and frequency is determined for different waveguide modes to or from the same coupling site.

8. A method as claimed in claim 6 wherein the said relationship between phase velocity and frequency is determined for different coupling sites.

9. A method of seismic surveying as claimed in claim 6 wherein a characterization of the guided mode propogation in the waveguide is obtained from the relationship between phase velocity and frequency and the nature of the coupling site is determined from the said guided mode propagation characterization and from the nature of the wavefield outside the waveguide at the coupling site.

10. A method of seismic surveying as claimed in any one of claims 1-3 wherein when a particular fault line is to be investigated, the fault line having distributed energy coupling sites thereon, the method includes arranging the geometry of the seismic source or sources, and the geophone or geophones in relation to the coupling sites in such a manner that there is a wavenumber match between the waveguide modes and the wave energy outside the 11. A method of seismic surveying as claimed in any one of claims 1-3 wherein when energy coupling sites are mapped from data derived from the detected seismic energy by an interactive modelling computer program, the method includes applying the data as input to the program and deriving as output a trial hypothesis display which is a map of the waveguide with a movable coupling segment and a field data display onto which the seismic arrival times corresponding to the trial hypothesis is superimposed for the purpose of comparison, and the method further includes the step of manipulating the trial hypothesis to determine a fitting of the data.

12. A method of seismic surveying as claimed in any one of claims 1 to 3 wherein when energy coupling sites are mapped from data derived from the detected seismic energy by inversion of the data, a seismic process of migration is employed.

13. A method of seismic surveying as claimed in claim 12 wherein a migration image of the waveguide is obtained by a summation of the data samples which correspond to the travel time which would be associated with a scatterer at each of a number of points which are prospective energy coupling sites taken in turn, the travel times being calculated by adding the waveguide propogation time to the site to surface travel time.

14. A method of seismic surveying as claimed in claim 13 wherein summation of data is effected in a partially coherent manner, coherent summation of data being effected for seismic sources less than a predetermined distance apart and incoherent summation of data being effected for sources more than said predetermined distance apart, incoherent summation being by conversion of the real seismic traces to complex analytic signals by a Hilbert transformation and summation of the amplitudes of the said complex signals, whereas coherent summation of data is effected by summation of the real seismic traces.

15. A method as claimed in claim 7 wherein the said relationship between phase velocity and frequency is determined for different coupling sites.

16. A method of seismic surveying as claimed in claim 7 wherein a characterization of the guided mode propagation in the waveguide is obtained for the relationship between phase velocity and frequency and the nature of the coupling site is determined from the said guided mode propagation characterization and from the nature of the wavefield outside the waveguided at the coupling site.

17. A method of seismic surveying as claimed in claim 8 wherein a characterization of the guided mode propagation in the waveguide is obtained for the relationship between phase velocity and frequency and the nature of the coupling site is determined from the said guided mode propagation characterization and from the nature of the wavefield outside the waveguide at the coupling site.

* * * * *